US012037100B2

(12) United States Patent
Castellani et al.

(10) Patent No.: US 12,037,100 B2
(45) Date of Patent: Jul. 16, 2024

(54) COMBINED OVERSPEED, FEATHERING, AND REVERSE ENABLER CONTROL VALVE FOR A PROPELLER ASSEMBLY

(71) Applicant: GE Avio S.r.l., Rivalta di Torino (IT)

(72) Inventors: Simone Castellani, Viareggio (IT); Giuseppe Cervelli, Casamassima (IT)

(73) Assignee: GE Avio S.r.l., Rivalta di Torino (IT)

( * ) Notice: Subject to any disclaimer, the term of this patent is extended or adjusted under 35 U.S.C. 154(b) by 524 days.

(21) Appl. No.: 16/815,942

(22) Filed: Mar. 11, 2020

(65) Prior Publication Data

US 2020/0298959 A1 Sep. 24, 2020

(30) Foreign Application Priority Data

Mar. 19, 2019 (IT) ........................ 102019000003999

(51) Int. Cl.
*B64C 11/40* (2006.01)
*F01D 5/02* (2006.01)

(52) U.S. Cl.
CPC .............. *B64C 11/40* (2013.01); *F01D 5/021* (2013.01); *F05D 2260/70* (2013.01)

(58) Field of Classification Search
CPC .............................. B64C 11/385; B64C 11/42
See application file for complete search history.

(56) References Cited

U.S. PATENT DOCUMENTS 2,980,188 A 4/1961 Allen, Jr. et al.
3,090,445 A 5/1963 Fischer
3,160,213 A 12/1964 Fischer
5,174,718 A 12/1992 Lampeter et al.
8,444,388 B2 5/2013 Gallet
8,545,178 B2 10/2013 Perkinson et al.
8,651,812 B2 2/2014 Wilson et al.
9,169,783 B2 * 10/2015 Kleckler ............... B64C 11/303
11,312,476 B2 * 4/2022 Hoemke ............... B64C 11/303

(Continued)

FOREIGN PATENT DOCUMENTS

CN 109131900 1/2019
EP 0311277 4/1989

(Continued)

OTHER PUBLICATIONS

Italian Patent Office, "Search Report," issued in connection with Italian patent application No. 201900003999, dated Dec. 6, 2019, 7 pages. English translation not available.

(Continued)

*Primary Examiner* — Christopher R Legendre
(74) *Attorney, Agent, or Firm* — Hanley, Flight & Zimmerman, LLC

(57) ABSTRACT

A variable pitch propeller assembly is operatively coupled with an engine and methods for controlling the pitch of a plurality of propeller blades thereof are associated. In one example aspect, the variable pitch propeller assembly includes features for combining overspeed, feathering, and reverse functionality in a single secondary control valve. The secondary control valve is operable to selectively allow a controlled amount of hydraulic fluid to flow to or from a pitch actuation assembly such that the pitch of the propeller blades can be adjusted to operate the variable pitch propeller assembly in one of a constant speed mode, a feather mode, and a reverse mode.

15 Claims, 8 Drawing Sheets

(56) References Cited

U.S. PATENT DOCUMENTS 11,554,851 B2 * 1/2023 Meunier .................. F01D 7/02
2010/0135799 A1 6/2010 Morgan
2013/0323050 A1 12/2013 Kleckler
2016/0244149 A1 * 8/2016 Carrington ............ B64C 11/301
2018/0057146 A1 3/2018 Futa, Jr. et al.
2018/0072402 A1 * 3/2018 Waddleton .............. B64C 11/38
2018/0134400 A1 5/2018 Knapp et al.
2019/0031319 A1 1/2019 Calkins et al.
2019/0092453 A1 3/2019 Hoemke et al.
2021/0079855 A1 * 3/2021 Cervelli .................. B64C 11/38

FOREIGN PATENT DOCUMENTS

EP 3290332 3/2018
EP 3434585 1/2019

OTHER PUBLICATIONS

European Patent Office, "Communication pursuant to Article 94(3) EPC," issued in connection with Application No. 20161704.0, dated Mar. 15, 2022, 5 pages.
European Patent Office, "Extended European Search report",issued in connection with EP patent application No. 20161704.0, dated Jul. 9, 2020, 8 pages.
Chinese Patent Application, "Office action," issued in connection with Application No. 202010189953.2, dated Feb. 7, 2020, 8 pages.

* cited by examiner

R
280
154
120
118
110
156
130
126
112
158
104
128
A
116
114
100
160
132
144
142
140
122
146
134
138
136
137
C
102

COMBINED OVERSPEED, FEATHERING, AND REVERSE ENABLER CONTROL VALVE FOR A PROPELLER ASSEMBLY

CROSS-REFERENCE TO RELATED APPLICATIONS

The present application claims the benefit of priority to Italian patent application No. 102019000003999, filed Mar. 19, 2019. Italian patent application No. 102019000003999 is hereby incorporated by reference in its entirety.

FIELD

The subject matter of the present disclosure is related generally to propeller control units.

BACKGROUND

Variable pitch propeller assemblies for aircraft are operatively configured to adjust propeller blades of the propeller assembly through a plurality of blade angles. In this manner, the propeller blades can be adjusted to a propeller blade angle that optimizes engine performance for given flight conditions or for ground operations. To adjust the propeller blade angle of the propeller blades, variable pitch propeller assemblies typically include a pitch control unit. Certain pitch control units can include a primary pitch control valve or governor. Based on one or more input signals, the primary control valve selectively allows an amount of hydraulic fluid to flow to or drain from a pitch actuation assembly positioned within the propeller assembly. By altering the amount of hydraulic fluid in the pitch actuation assembly, the blade angle of the propeller blades can be set to the desired pitch.

For constant-speed variable pitch propeller assemblies, the pitch control unit is configured to maintain constant engine speed by adjusting the propeller blade angle to vary the load on the propeller in response to changing flight conditions. In particular, the primary control valve modulates the pitch of the propeller blades to keep the reference speed. In some instances, the propeller assembly can experience an overspeed condition, which occurs when propeller RPM increases above the reference speed, and in some instances, the propeller assembly can experience an underspeed condition, which occurs when propeller RPM decreases below the reference speed. When an overspeed or underspeed condition is experienced, the primary control valve controls the flow of hydraulic fluid through the system such that the propeller assembly returns to an onspeed condition, or a condition in which the actual RPM of the engine is the same as the reference speed.

In some cases, however, the primary control valve can fail or can be unresponsive when the propeller assembly experiences an overspeed condition. To prevent the propeller assembly from reaching a destructive overspeed condition, pitch control units typically include an overspeed governor. Overspeed governors intervene when the propeller speed reaches an overspeed reference value typically higher than the reference speed and adjust pitch in a manner that overrides the primary control valve in a coarsening direction and governs to the overspeed reference value. In the past, overspeed governors have typically been mechanical devices (e.g., flyweight governors). However, such conventional mechanical overspeed governors include many parts, increase the weight of the engine, and typically include overspeed testing components (e.g., solenoid test valves) for ensuring proper operation of the overspeed governor. The weight of the overspeed governor and overspeed testing components are penalties on the efficiency of the engine.

Moreover, some variable pitch propeller assemblies are configured as feathering propeller assemblies. Such feathering propeller assemblies typically include a solenoid-operated feather valve. The solenoid-operated feather valve is operatively configured to switch the propeller assembly into a feather mode. The feathering mode can be commanded by a pilot by a dedicated cockpit switch, can be commanded by an engine controller after a normal shutdown, or can be commanded automatically by the engine controller (i.e., autofeather) when an engine flames out or an unexpected sudden reduction of power is detected. Such conventional solenoid-operated feather valves and accompanying sensing components can increase the weight of the engine, which is a penalty on the efficiency of the engine.

In addition, some variable pitch propeller assemblies include ground beta or reverse mode functionality. For instance, some propeller assemblies include a ground beta enable solenoid and a ground beta enable valve that effectively enable the propeller blades to move to a fine pitch position, e.g., for taxiing on the ground, or a reverse angle, e.g., for reverse and braking. These conventional solenoids and valves can increase the weight of the engine, which is a penalty on the efficiency of the engine.

Therefore, there is a need for improved propeller assemblies and/or methods therefore that address one or more of these challenges.

BRIEF DESCRIPTION

Aspects and advantages of the invention will be set forth in part in the following description, or may be obvious from the description, or may be learned through practice of the invention.

In one aspect, a variable pitch propeller assembly for an engine defining an axial direction, a radial direction, and a circumferential direction is provided. The variable pitch propeller assembly includes a plurality of propeller blades rotatable about the axial direction and spaced apart along the circumferential direction. Each propeller blade is rotatable through a plurality of blade angles about respective pitch axes each extending in the radial direction. Further, the variable pitch propeller assembly includes a pitch actuation assembly for adjusting the plurality of propeller blades through the plurality of blade angles. The variable pitch propeller assembly also includes a pitch control unit. The pitch control unit includes a primary control valve operable to selectively allow a flow of hydraulic fluid to or from the pitch actuation assembly. The pitch control unit also includes a secondary control valve adjustable between a constant speed mode, a feather mode, and a reverse mode and operable to selectively allow a flow of hydraulic fluid to or from the pitch actuation assembly based at least in part on the mode of the secondary control valve.

In some embodiments, the secondary control valve has a valve body defining a chamber and a spool movable within the chamber, and wherein the spool is movable between a plurality of constant speed positions in the constant speed mode, one or more feather positions in the feather mode, and one or more reverse positions in the reverse mode to enable the plurality of propeller blades to rotate to a negative blade angle.

In some embodiments, the secondary control valve is an electrohydraulic servovalve (EHSV).

In some embodiments, the pitch actuation assembly includes a cylinder defining a chamber and a control piston translatable within the cylinder. Further, the pitch actuation assembly includes a piston rod connected to the control piston and extending into a propeller gear box of the engine, the piston rod translatable in unison with the control piston. Further, the pitch actuation assembly includes an oil transfer bearing surrounding the piston rod within the propeller gear box of the engine and defining a flight gallery fluidly connected with the secondary control valve and a ground gallery fluidly connected with the secondary control valve. Moreover, the pitch actuation assembly includes a beta tube enclosed within the piston rod and fluidly connecting the flight gallery with the chamber of the cylinder.

In some embodiments, when the secondary control valve is adjusted to the feather mode, the secondary control valve selectively allows the flow of hydraulic fluid to flow from the chamber of the cylinder to the secondary control valve.

In some embodiments, when the secondary control valve is adjusted to the reverse mode, the secondary control valve selectively allows the flow of hydraulic fluid to flow from the secondary control valve to the chamber and from the secondary control valve to the ground gallery.

In some embodiments, when the secondary control valve is adjusted to the constant speed mode, the secondary control valve selectively allows the flow of hydraulic fluid to flow between the chamber and the secondary control valve to maintain an onspeed condition.

In some embodiments, a flight gallery conduit fluidly connects the secondary control valve with the flight gallery and a ground gallery conduit fluidly connects the secondary control valve with the ground gallery.

In some embodiments, the primary control valve is an electrohydraulic servovalve (EHSV).

In another aspect, a method for controlling a variable pitch propeller assembly driven by a powerplant using a propeller control system is provided. The powerplant defines an axial direction and a radial direction and includes a controller. The variable pitch propeller assembly has a plurality of propeller blades rotatable about the axial direction and adjustable about respective pitch axes each extending along the radial direction. Further, the propeller control system includes a pitch actuation assembly for actuating the propeller blades about their respective pitch axes and a pitch control unit for driving the pitch actuation assembly. The propeller control system also includes a primary control valve and a secondary control valve both communicatively coupled with the controller. The primary control valve and the secondary control valve are each configured to selectively control a flow of hydraulic fluid to or from the pitch actuation assembly. The method includes operating the powerplant; receiving, by the controller, one or more operational parameters relating to operation of the powerplant; determining, by the controller, a condition of the powerplant based at least in part on the one or more operational parameters; and controlling, by the controller, the secondary control valve adjustable between a constant speed mode, a feather mode, and a reverse mode to selectively allow a controlled amount of hydraulic fluid to or from the pitch actuation assembly based at least in part on the condition determined.

In some implementations, the condition is an overspeed condition.

In some implementations, the condition is a reverse thrust condition.

In some implementations, the condition is an engine failure condition.

In some implementations, the one or more operational parameters relating to operation of the powerplant are indicative of a power setting of the powerplant and are indicative of a torque output of the powerplant, and wherein determining, by the controller, the condition of the powerplant based at least in part on the one or more operational parameters includes comparing the power setting with the torque output of the powerplant, and wherein if the torque is below a predetermined threshold, in determining, by the controller, the condition of the powerplant, the secondary control valve is controlled by the controller to selectively allow the controlled amount of hydraulic fluid to flow to or from the pitch actuation assembly such that the propeller blades are rotated to a feathered position.

In yet another aspect, a variable pitch propeller assembly for an engine defining an axial direction, a radial direction, and a circumferential direction is provided. The variable pitch propeller assembly includes a plurality of propeller blades rotatable about the axial direction and spaced apart along the circumferential direction, each propeller blade rotatable through a plurality of blade angles about respective pitch axes each extending in the radial direction. The variable pitch propeller assembly also includes a pitch actuation assembly for adjusting the plurality of propeller blades through the plurality of blade angles. Further, the variable pitch propeller assembly includes a pitch control unit. The pitch control unit includes a primary control valve operable to selectively allow a flow of hydraulic fluid to or from the pitch actuation assembly. The pitch control unit also includes a secondary EHSV control valve having a valve body defining a chamber and a spool movable within the chamber, the spool is movable between a plurality of constant speed positions to operate the variable pitch propeller assembly in a constant speed mode, one or more feather positions to operate the variable pitch propeller assembly in a feather mode, and one or more reverse positions to operate the variable pitch propeller assembly in a reverse mode.

In some embodiments, the spool defines a first groove and a second groove, and wherein the primary control valve is fluidly connected with the first groove when the spool is in one of the plurality of constant speed positions or in one of the one or more reverse positions.

In some embodiments, the primary control valve is not fluidly connected with the first groove of the spool when the spool is in one of the one or more feather positions.

In some embodiments, the pitch actuation assembly includes a cylinder defining a chamber, a control piston translatable within the cylinder, and a piston rod connected to the control piston and extending into a propeller gear box of the engine, the piston rod translatable in unison with the control piston. In such embodiments, the pitch actuation assembly also includes an oil transfer bearing surrounding the piston rod within the propeller gear box of the engine and defining a flight gallery fluidly connected with the secondary EHSV control valve and a ground gallery fluidly connected with the secondary EHSV control valve. Further, the pitch actuation assembly includes a beta tube enclosed within the piston rod and fluidly connecting the flight gallery with the chamber of the cylinder.

In some embodiments, the spool defines a first groove and a second groove, and wherein the first groove is fluidly connected with the flight gallery and the second groove is fluidly connected with the ground gallery when the spool is in one of the one or more reverse positions, and wherein the second groove is not fluidly connected with the ground gallery when the spool is in one of the one or more feather positions or when the spool is in one of the plurality of constant speed positions.

In some embodiments, the secondary EHSV control valve is fluidly connected with a drain, and wherein the spool defines a first groove, a second groove, and a third groove, and wherein when the spool is in one of the one or more reverse positions, the third groove does not fluidly connect the ground gallery with the drain, and wherein when the spool is in one of the one or more feather positions or one of the plurality of constant speed positions, the third groove fluidly connects the ground gallery with the drain.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
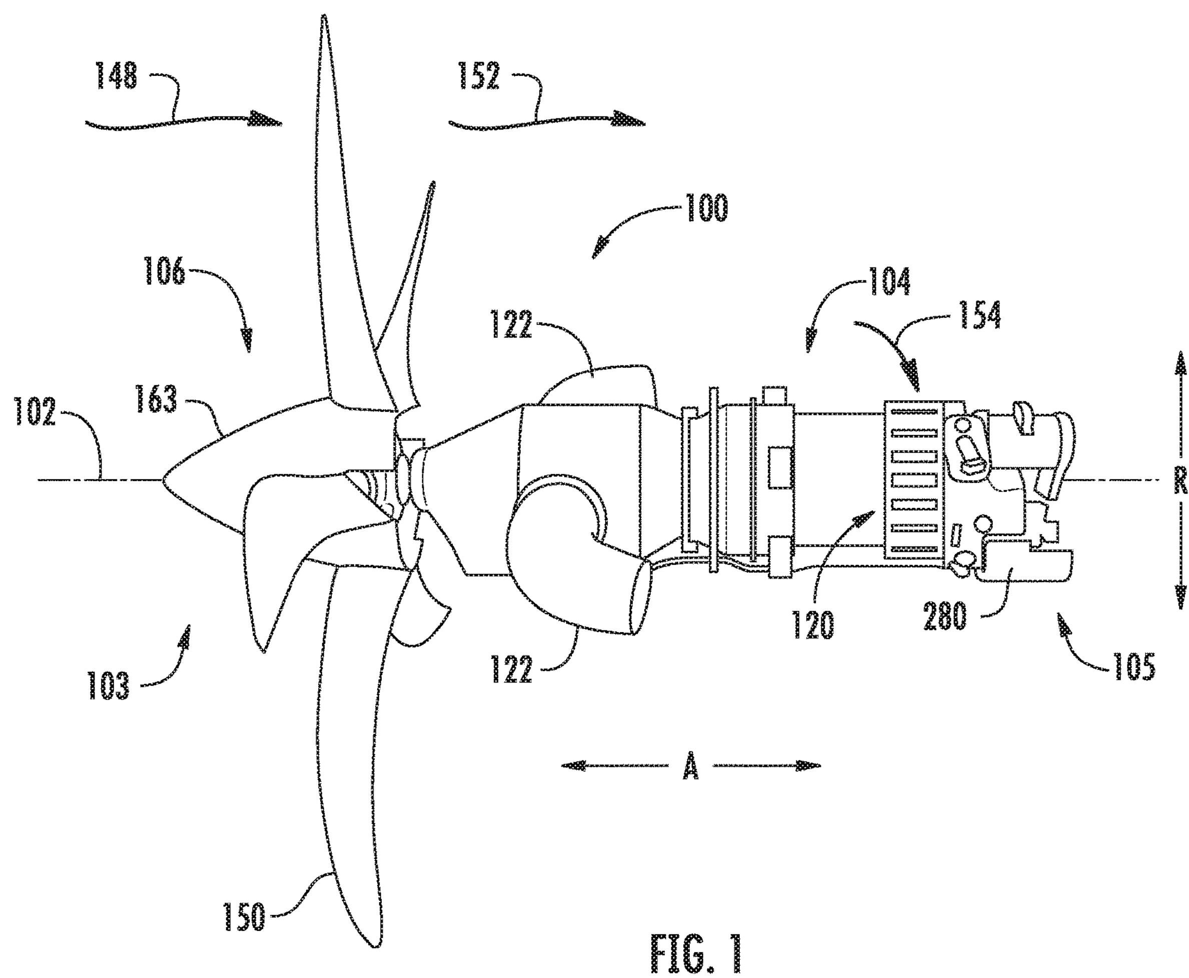
FIG. 1 provides a side view of an example gas turbine engine according to an example embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

The subject matter of the present disclosure is directed generally to variable pitch propeller assemblies and methods therefore for controlling the pitch of a plurality of propeller blades of a variable pitch propeller assembly. In one example aspect, the variable pitch propeller assembly includes features for combining overspeed, feathering, and reverse enabling functionality in a single electrohydraulic servovalve (EHSV). In particular, in one example aspect, a variable pitch propeller assembly includes a secondary EHSV control valve operatively configured to protect the propeller assembly and engine from an overspeed condition, and more generally for maintaining the propeller assembly and engine in an onspeed condition during flight, as well as providing feathering functionality in the event a primary pitch control valve fails or is otherwise unresponsive or operating conditions require it. Further, the secondary control valve is operatively configured to enable reverse functionality. That is, the secondary control valve is configured to enable the propeller blades to be actuated to a reverse pitch, e.g., to produce a reverse thrust. The secondary control valve is operable to selectively allow a controlled amount of hydraulic fluid to flow to or from a pitch actuation assembly such that the pitch of the propeller blades can be adjusted to operate the variable pitch propeller assembly in one of a constant speed mode, a feather mode, and a reverse mode.

By combining the overspeed (or more generally constant speed), feathering, and reverse enabling functionality into an electronically controlled secondary control valve, conventional fly-ball overspeed governors and their accompanying overspeed testing components, conventional separate solenoid-operated feather valves, and conventional reverse enabling solenoid valves can be eliminated. Thus, the weight of the engine or power plant can be reduced. Moreover, in some embodiments, the controller can control the protective overspeed, feathering, and reverse enabling functions, and thus, the electronically controlled secondary control valve offers more system flexibility. For example, thresholds and settings relating to when an engine is operating in an onspeed or overspeed can be adjusted, or these thresholds and settings can be adjusted when an engine failure condition has actually occurred. Conventional mechanical overspeed governors and binary feathering valves offered no such flexibility.

Figure 2:
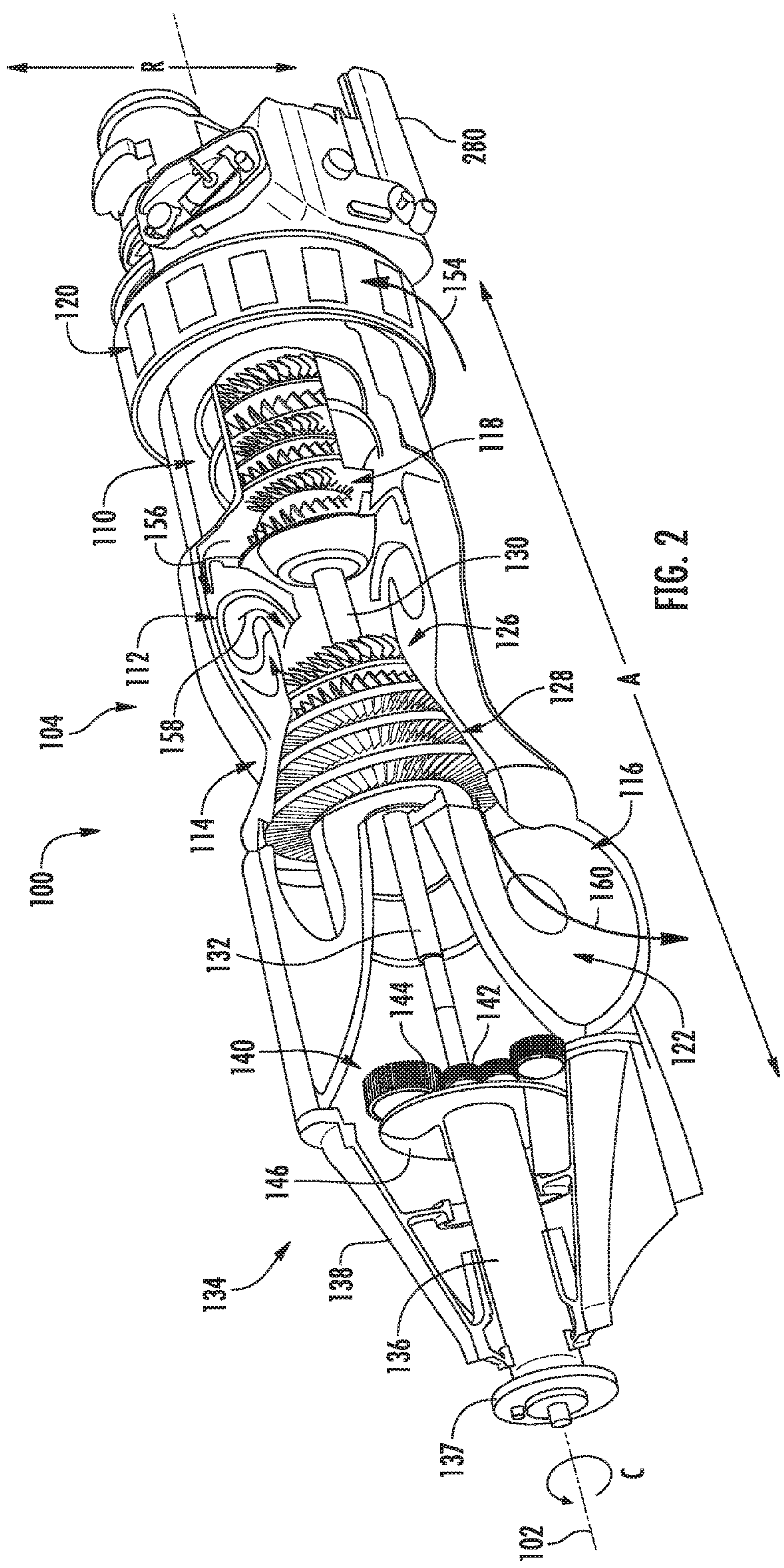
FIG. 2 provides a perspective, cutaway view of the gas turbine engine of FIG. 1.

FIGS. 1 and 2 provide various views of an example engine 100 according to example embodiments of the present disclosure. Particularly, FIG. 1 provides a side view of the engine 100 and FIG. 2 provides a perspective, cutaway view of the engine 100 of FIG. 1. As shown in FIG. 1, for this embodiment, the engine 100 is a gas turbine engine, and more specifically, a turboprop engine. The gas turbine engine 100 defines an axial direction A, a radial direction R, and a circumferential direction C (FIG. 2) extending three hundred sixty degrees (360°) around the axial direction A. The gas turbine engine 100 also defines a longitudinal or axial centerline 102 extending along the axial direction A. The gas turbine engine 100 extends generally along the axial direction A between a first end 103 and a second end 105, which for this embodiment is the forward and aft end, respectively. Generally, the gas turbine engine 100 includes a gas generator or core turbine engine 104 and a propeller assembly 106 rotatable about the axial centerline 102, or more generally, the axial direction A.

As shown best in FIG. 2, the core turbine engine 104 generally includes, in serial flow arrangement, a compressor section 110, a combustion section 112, a turbine section 114, and an exhaust section 116. A core air flowpath 118 extends from an annular inlet 120 to one or more exhaust outlets 122 of the exhaust section 116 such that the compressor section 110, combustion section 112, turbine section 114, and exhaust section 116 are in fluid communication.

The compressor section 110 can include one or more compressors, such as a high pressure compressor (HPC) and a low pressure compressor (LPC). For this embodiment, the compressor section 110 includes a four-stage axial, single centrifugal compressor. In particular, the compressor includes sequential stages of compressor stator vanes and rotor blades (not labeled), as well as an impeller (not labeled) positioned downstream of the axial stages of stator vanes and rotor blades. The combustion section 112 includes a reverse-flow combustor (not labeled) and one or more fuel nozzles (not shown). The turbine section 114 can define one or more turbines, such as a high pressure turbine (HPT) and a low pressure turbine (LPT). For this embodiment, the turbine section 114 includes a two-stage HPT 126 for driving the compressor of the compressor section 110. The HPT 126 includes two sequential stages of stator vanes and turbine blades (not labeled). The turbine section 114 also includes a three-stage free or power turbine 128 that drives a propeller gearbox 134, which in turn drives the propeller assembly 106 (FIG. 1). The exhaust section 116 includes one or more exhaust outlets 122 for routing the combustion products to the ambient air.

Referring still to FIG. 2, the core turbine engine 104 can include one or more shafts. For this embodiment, the gas turbine engine 100 includes a compressor shaft 130 and a free or power shaft 132. The compressor shaft 130 drivingly couples the turbine section 114 with the compressor section 110 to drive the rotational components of the compressor. The power shaft 132 drivingly couples the power turbine 128 to drive a gear train 140 of the propeller gearbox 134, which in turn operatively supplies power and torque to the propeller assembly 106 (FIG. 1) via a torque output or propeller shaft 136 at a reduced RPM. The forward end of the propeller shaft 136 includes a flange 137 that provides a mounting interface for the propeller assembly 106 to be attached to the core turbine engine 104.

The propeller gearbox 134 is enclosed within a gearbox housing 138. For this embodiment, the housing 138 encloses the epicyclical gear train 140 that includes a star gear 142 and a plurality of planet gears 144 disposed about the star gear 142. The planetary gears 144 are configured to revolve around the star gear 142. An annular gear 146 is positioned axially forward of the star and planetary gears 142, 144. As the planetary gears 144 rotate about the star gear 142, torque and power are transmitted to the annular gear 146. As shown, the annular gear 146 is operatively coupled to or otherwise integral with the propeller shaft 136. In some embodiments, the gear train 140 may further include additional planetary gears disposed radially between the plurality of planet gears 144 and the star gear 142 or between the plurality of planet gears 144 and the annular gear 146. In addition, the gear train 140 may further include additional annular gears.

As noted above, the core turbine engine 104 transmits power and torque to the propeller gearbox 134 via the power shaft 132. The power shaft 132 drives the star gear 142, which in turn drives the planetary gears 144 about the star gear 142. The planetary gears 144 in turn drive the annular gear 146, which is operatively coupled with the propeller shaft 136. In this way, the energy extracted from the power turbine 128 supports operation of the propeller shaft 136, and through the power gear train 140, the relatively high RPM of the power shaft 132 is reduced to a more suitable RPM for the propeller assembly 106.

In addition, the gas turbine engine 100 includes one or more controllers 280 that control the core turbine engine 104 and the propeller assembly 106. For this embodiment, the controller 280 is a single unit control device for a Full Authority Digital Engine (FADEC) system operable to provide full digital control of the core turbine engine 104, and in some embodiments, the propeller assembly 106. The controller 280 depicted in the illustrated embodiment of FIGS. 1 and 2 can control various aspects of the core turbine engine 104 and the propeller assembly 106. For example, the controller 280 can receive one or more signals from sensory or data collection devices and can determine the blade angle of a plurality of propeller blades 150 about their respective pitch axes, as well as their rotational speed about the axial direction A based at least in part on the received signals. The controller 280 can in turn control one or more components of the gas turbine engine 100 based on such signals. For example, based at least in part on one or more speed or blade pitch signals (or both), the controller 280 can be operatively configured to control one or more valves such that an amount of hydraulic fluid can be delivered or returned from a pitch actuation assembly of the gas turbine engine 100 as will be described in greater detail herein. The internal components of the controller 280 will likewise be described in detail herein.

With reference to FIG. 1, during operation of the gas turbine engine 100, a volume of air indicated by arrow 148 passes across the plurality of propeller blades 150 circumferentially spaced apart from one another along the circumferential direction C and disposed about the axial direction A, and more particularly for this embodiment, the axial centerline 102. The propeller assembly 106 includes a spinner 163 aerodynamically contoured to facilitate an airflow through the plurality of propeller blades 150. The spinner 163 is rotatable with the propeller blades 150 about the axial direction A and encloses various components of the propeller assembly 106, such as e.g., the hub, propeller pitch actuator, piston/cylinder actuation mechanisms, etc. A first portion of air indicated by arrow 152 is directed or routed outside of the core turbine engine 104 to provide propulsion. A second portion of air indicated by arrow 154 is directed or routed through the annular inlet 120 of the gas turbine engine 100.

As shown in FIG. 2, the second portion of air 154 enters through the annular inlet 120 and flows downstream to the compressor section 110, which is a forward direction along the axial direction A in this embodiment. The second portion of air 154 is progressively compressed as it flows through the compressor section 110 downstream toward the combustion section 112.

The compressed air indicated by arrow 156 flows into the combustion section 112 where fuel is introduced, mixed with at least a portion of the compressed air 156, and ignited to form combustion gases 158. The combustion gases 158 flow downstream into the turbine section 114, causing rotary members of the turbine section 114 to rotate, which in turn supports operation of respectively coupled rotary members in the compressor section 110 and propeller assembly 106. In particular, the HPT 126 extracts energy from the combustion gases 158, causing the turbine blades to rotate. The rotation of the turbine blades of the HPT 126 causes the compressor shaft 130 to rotate, and as a result, the rotary components of the compressor are rotated about the axial direction A. In a similar fashion, the power turbine 128 extracts energy from the combustion gases 158, causing the blades of the power turbine 128 to rotate about the axial direction A. The rotation of the turbine blades of the power turbine 128 causes the power shaft 132 to rotate, which in turn drives the power gear train 140 of the propeller gearbox 134.

The propeller gearbox 134 in turn transmits the power provided by the power shaft 132 to the propeller shaft 136 at a reduced RPM and desired amount of torque. The propeller shaft 136 in turn drives the propeller assembly 106 such that the propeller blades 150 rotate about the axial direction A, and more particularly for this embodiment, the axial centerline 102 of the gas turbine engine 100. The exhaust gases, denoted by 160, exit the core turbine engine 104 through the exhaust outlets 122 to the ambient air.

It should be appreciated that the example gas turbine engine 100 described herein is provided by way of example only. For example, in other example embodiments, the engine may include any suitable number or types of compressors (such as e.g., reverse flow and/or axial compressors), turbines, shafts, stages, etc. Additionally, in some example embodiments, the gas turbine engine may include any suitable type of combustor, and may not include the example reverse-flow combustor depicted. It will further be appreciated that the engine can be configured as any suitable type of gas turbine engine, including, for example, turboshaft, turbojets, etc. Moreover, in yet other embodiments, the engine can be configured as a reciprocating or piston engine. In addition, it will be appreciated that the present subject matter can be applied to or employed with any suitable type of propeller or fan configuration, including, for example, tractor and pusher configurations.

Furthermore, although the gas turbine engine 100 described above is an aeronautical gas turbine engine for propulsion of a fixed-wing aircraft, the gas turbine engine may be configured as any suitable type of gas turbine engine for use in any number of applications, such as marine applications. Furthermore, the invention could be used on other devices with variable pitch blades such as windmills. The propeller assembly 106 may rotate due to passing of a fluid, such as air or water, across the plurality of blades 150 of the propeller assembly 106.

Figure 3:
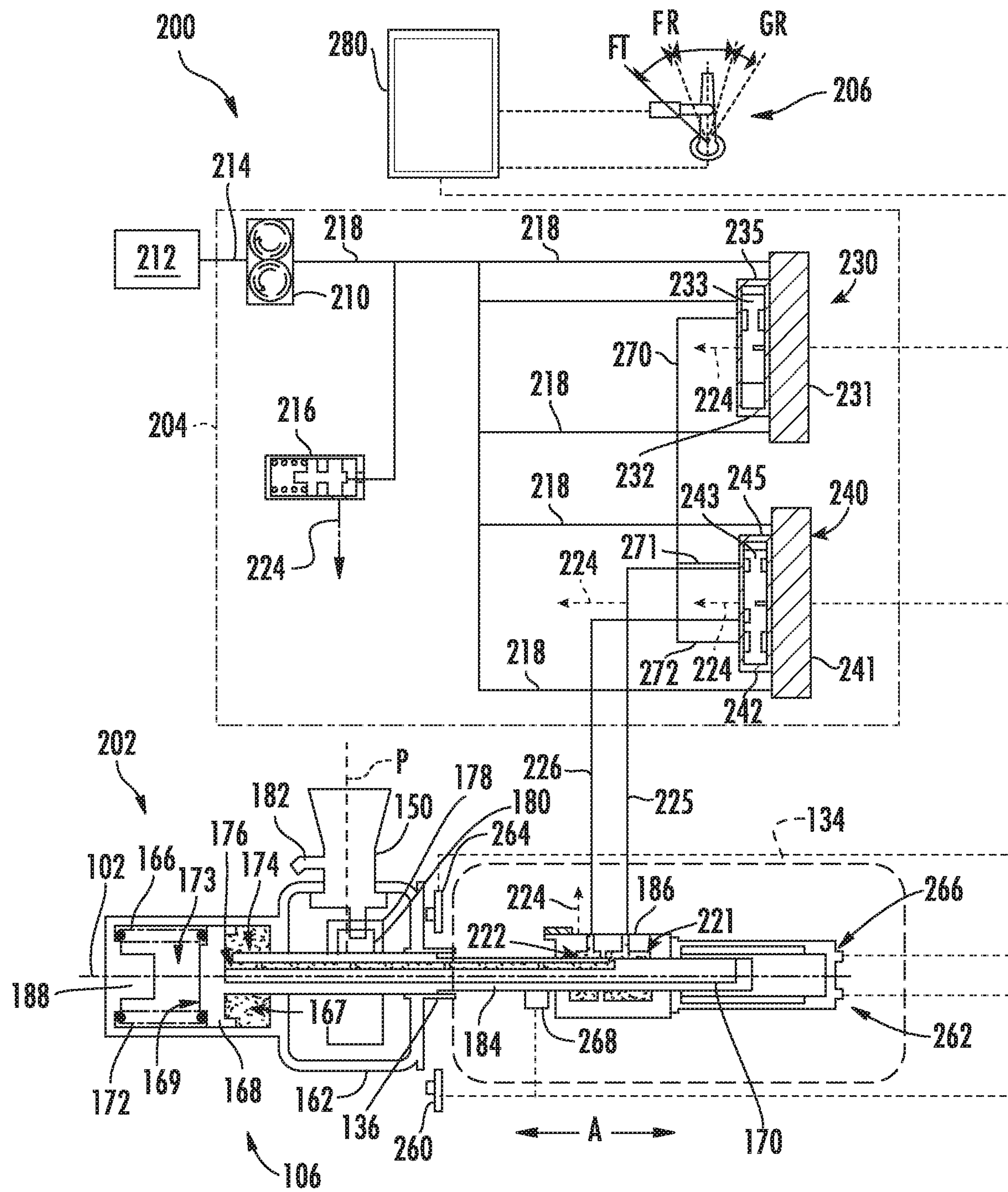
FIG. 3 provides a schematic view of an example propeller control system of the gas turbine engine of FIG. 1.

FIG. 3 provides a schematic view of an example propeller control system 200 for controlling the propeller assembly 106 of the gas turbine engine 100 of FIGS. 1 and 2 according to an example embodiment of the present disclosure. As depicted in FIG. 3, the propeller assembly 106 is driven by the core turbine engine 104 (FIG. 2) by the propeller shaft 136. The propeller shaft 136 in turn drives a hub 162 from which the plurality of propeller blades 150 extend outwardly from in the radial direction R. As the propeller shaft 136 rotates about the axial direction A, the hub 162 in turn rotates the propeller blades 150 about the axial direction A. The propeller control system 200 includes features for controlling the rotational speed of the propeller blades 150 about the axial direction A and the pitch of the propeller blades 150, as well as features for protecting the components of the propeller assembly 106. As shown in FIG. 3, for this embodiment, generally, the propeller control system 200 includes a pitch actuation assembly 202, a pitch control unit 204, a power lever 206, and controller 280.

Generally, the pitch actuation assembly 202 is operatively configured to adjust the plurality of propeller blades 150 through a plurality of blade angles. Stated differently, the pitch actuation assembly 202 is operatively configured to rotate each propeller blade 150 about respective pitch axes P extending in the radial direction R (each pitch axis P is relative to a corresponding propeller blade 150). For the example embodiment of FIG. 3, the pitch actuation assembly 202 is operatively configured to rotate the plurality of propeller blades 150 between high or coarse pitch blade angles, including a fully feathered blade angle to low or fine pitch blade angles. Moreover, for this example embodiment, the pitch actuation assembly 202 is additionally operatively configured to rotate the plurality of propeller blades 150 through reverse pitch angles, which can be useful for ground or taxiing operations, particularly where an aircraft includes multiple engines. In this regard, the example propeller assembly 106 depicted in FIG. 3 is a variable pitch, full feathering, and reverse enabled propeller assembly, and more particularly still, the propeller assembly is configured as a variable pitch constant-speed, full feathering, reverse enabled propeller assembly. A pilot or aircrew member can operate the propeller assembly 106 in one of the modes noted above utilizing one or more levers. For instance, as shown in FIG. 3, the aircraft to which the gas turbine engine 100 is operatively coupled includes control levers. In particular, for this embodiment, the aircraft includes power lever 206. The power lever 206 can be set within a ground range GR (e.g., for taxiing), within a flight range FR, or within a feathering range FT (e.g., in the event of engine failure). In some embodiments, the aircraft to which the gas turbine engine 100 is operatively coupled includes other control levers, such as e.g., a condition lever, propeller speed levers, mixture levers, etc.

As further shown in FIG. 3, for this embodiment, the pitch actuation assembly 202 includes a single-acting system for controlling or adjusting the pitch of the propeller blades 150. It will be appreciated, however, that the pitch actuation assembly 202 can be a double-acting system in other example embodiments. The single-acting system pitch actuation assembly 202 of FIG. 3 includes a housing or cylinder 166 that defines a chamber and encloses a control piston 168 that is translatable along the axial direction A within the chamber of the cylinder 166. In particular, as shown, the cylinder 166 and the outboard side 169 of the control piston 168 define a first side 173 of the chamber and the cylinder 166 and the inboard side 167 of the control piston 168 define a second side 174 of the chamber. The control piston 168 separates the first side 173 from the second side 174 of the chamber along the axial direction A. The control piston 168 is biased on its outboard side 169 by a feather spring 172 positioned within the first side 173 of the chamber, as well as by one or more counterweights 182 operatively coupled with one or more propeller blades 150.

The control piston 168 is operatively coupled with a piston rod 184 that extends along the axial direction A. In particular, the piston rod 184 extends from the propeller assembly 106 (where the piston rod 184 is connected to the control piston 168) to the propeller gearbox 134 along the axial direction A. The piston rod 184 and the control piston 168 are translatable in unison. The piston rod 184 encloses an oil transfer or beta tube 170 that also extends along the axial direction A. When the propeller blades 150 are rotated about the axial direction A, the piston rod 184 and the beta tube 170 are likewise rotatable about the axial direction A. Like the piston rod 184, the beta tube 170 extends at least partially into the propeller assembly 106 and at least partially into the propeller gearbox 134 positioned within the gearbox housing 138 (FIG. 2). To control the blade angles of the propeller blades 150, hydraulic fluid (e.g., oil) can be fed through the beta tube 170 and/or other fluid channels to the second side 174 of the chamber (or to the first side 173 of the chamber in a double-acting system) to translate the control piston 168 along the axial direction A. In some embodiments, the beta tube 170 can define one or more orifices 176 that permit hydraulic fluid to flow from the hollow beta tube 170 to the second side 174 of the chamber depending on the desired blade pitch. Hydraulic fluid can enter and exit the beta tube 170 through an oil transfer bearing 186 surrounding the piston rod 184 within the propeller gear box 134. The oil transfer bearing 186 defines an annular flight gallery 221 and an annular ground gallery 222.

With reference still to FIG. 3, during operation of the gas turbine engine 100, for this example embodiment, the spring 172 and the counterweights 182 constantly urge the control piston 168 along the axial direction A (a direction to the right in FIG. 3) such that the propeller blades 150 operatively coupled with the control piston 168 (e.g., by the piston rod and an actuation lever coupled thereto) are driven toward a coarse or high pitch position.

To actuate the propeller blades 150 toward a low or fine pitch position, an amount of hydraulic fluid is delivered to the second side 174 of the chamber such that a force sufficient to overcome the biasing force of the spring 172 and the counterweights 182 is applied to the inboard side 167 of the control piston 168. The hydraulic force on the inboard side 167 of the control piston 168 actuates the control piston 168 along the axial direction A (a direction to the left in FIG. 3). This in turn causes the piston rod 184 and enclosed beta tube 170 to translate forward along the axial direction A (or toward the left in FIG. 3). When the control piston 168 is moved forward along the axial direction A, the propeller blades 150 are rotated to a more fine or low pitch position. When rotated to a more fine position, the propeller blades 150 take less "bite" out of the air when the propeller is operating in a forward mode. In a reverse mode, the propeller blades 150 take a greater "bite" out of the air when rotated to a more fine position.

When it is desired to adjust the angle of the propeller blades 150 back toward coarse or high pitch, an amount of hydraulic fluid within the second side 174 of the chamber is returned or scavenged back to the engine (e.g., via one of the drains 224) such that the spring 172 and the counterweights 182 can urge the control piston 168 rearward along the axial direction A (a direction to the right in FIG. 3). The hydraulic fluid can drain through the beta tube 170 and to the oil transfer bearing 186 positioned within the propeller gearbox 134. The hydraulic fluid can then be drained to a sump or other like structure. When rotated to a more coarse position, the propeller blades 150 take a greater "bite" out of the air when the propeller is operating in a forward mode. In a reverse mode, the propeller blades 150 take less "bite" out of the air when rotated to a more coarse position.

The translation of the control piston 168 along the axial direction A in turn causes the piston rod 184 to translate along the axial direction A as well. To move the propeller blades 150 about their respective pitch axes P, the propeller assembly 106 includes a pitch actuation or propeller pitch actuator 178 to pitch or actuate the propeller blades 150. When the control piston 168 is translated along the axial direction A, the propeller pitch actuator 178, which is operatively coupled to the piston rod 184 in this embodiment, rotates the propeller blades 150 about their respective pitch axes P. Accordingly, the axial position of the piston rod 184 and beta tube 170 corresponds with a particular blade angle or angular position of the propeller blades 150.

As further shown in FIG. 3, the piston rod 184 encloses beta tube 170 as well as the propeller pitch actuator 178 operatively coupled thereto. The piston rod 184 is operatively coupled with the propeller pitch actuator 178, which in this embodiment includes an actuation lever 180. The actuation lever 180 is operatively coupled to the plurality of blades 150 such that movement of the actuation lever 180 along the axial direction A moves or rotates the plurality of blades 150 about their respective pitch axes P. Stated alternatively, as the piston rod 184 and enclosed beta tube 170 translate along the axial direction A (caused by the axial displacement of the control piston 168), the actuation lever 180 also translates along the axial direction A. This in turn causes the plurality of blades 150 to rotate about their respective pitch axes P, thereby adjusting the blade angles of the propeller blades 150 to the desired pitch. Thus, by controlling the quantity of hydraulic fluid within the second side 174 of the chamber, the propeller blades 150 can be controlled through a plurality of blade angles about their respective pitch axes P by the actuation lever 180.

In some example embodiments, it will be appreciated that the propeller pitch actuator 178 may include additional or alternative structures that provide pitch actuation functionality. For example, such structures may include actuation linkages linking the control piston 168, piston rod, or other axially displaceable components with the propeller blades 150. Other structures may include a yoke and cam assembly operatively coupled with the beta tube 170 and/or piston rod 184 enclosing the beta tube 170. Any suitable structure can be used to rotate the propeller blades 150 about their respective pitch axes P. Stated alternatively, any known assemblies or structures for converting the translatory motion of the piston rod 184 into rotational motion of the propeller blades 150 is contemplated.

As further depicted in FIG. 3, an example pitch control unit 204 of the propeller control system 200 is provided. Generally, the pitch control unit 204 is operatively configured to provide an amount of hydraulic fluid to the pitch actuation assembly 202 such that the pitch actuation assembly 202 can adjust the plurality of propeller blades 150 through a plurality of blade angles. More specifically, the pitch control unit 204 is operatively configured to deliver or return an amount of hydraulic fluid from the second side 174 of the chamber such that the control piston 168 is translated along the axial direction A, which in turn drives the piston rod 184 along the axial direction A, causing the propeller pitch actuator 178 to adjust the plurality of propeller blades 150 about their respective pitch axes P.

For this embodiment, the pitch control unit 204 includes a high pressure pump 210 positioned downstream of and in fluid communication with a lubrication supply 212, such as e.g., hydraulic fluid from the engine. The lubrication supply 212 is configured to supply hydraulic fluid, such as e.g., oil, to the propeller control system 200. The high pressure pump 210 is operatively configured to increase the pressure of the hydraulic fluid as it flows from the lubrication supply 212 downstream to the components of the propeller control system 200. A lubrication supply conduit 214 provides fluid communication between the lubrication supply 212 and the high pressure pump 210.

A pressure relief valve 216 is positioned downstream of the high pressure pump 210 and is in fluid communication with the high pressure pump 210. For this example embodiment, the pressure relief valve 216 is in fluid communication with the high pressure pump 210 via a high pressure (HP) conduit 218. The pressure relief valve 216 is operatively configured to regulate the pressure of the hydraulic fluid within the propeller control system 200. In the event the pressure of the hydraulic fluid within the HP conduit 218 exceeds a predetermined threshold, the pressure relief valve 216 can drain an amount of hydraulic fluid from the HP conduit 218. In particular, the pressure of the hydraulic fluid acting on the control piston of the pressure relief valve 216 overcomes a spring biasing force applied by a spring of the pressure relief valve 216, allowing an amount of hydraulic fluid to drain from the system, as indicated by 224. The hydraulic fluid can then be scavenged to the lubrication supply 212, for example.

With reference still to FIG. 3, the pitch control unit 204 includes a primary pitch control valve 230. The primary control valve 230 is operatively configured to adjust the propeller pitch or blade angles of the propeller blades 150 during normal operation of the engine. For this embodiment, the primary control valve 230 is a spool-type directional EHSV. The primary control valve 230 is positioned downstream of and is in fluid communication with the high pressure pump 210. In particular, the primary control valve 230 is in fluid communication with the high pressure pump 210 via the HP conduit 218. A first portion of the high pressure hydraulic fluid from the high pressure pump 210 is delivered to a first stage 231 of the primary control valve 230, which is a double nozzle-flapper valve that includes a toque motor, a flapper, two nozzles, and a feedback spring. A second portion of the high pressure hydraulic fluid from the high pressure pump 210 is delivered to a second stage 232 of the primary control valve 230, which is a precision control spool valve. The second stage 232 of the primary pitch control valve 230 has a valve body 235 defining a chamber and a spool 233 movable within the chamber. The first portion of the high pressure hydraulic fluid delivered to first stage 231 can be used to actuate the second stage 232 precision control spool. In this way, the primary control valve 230 can selectively control or allow a flow of hydraulic fluid to or from the pitch actuation assembly 202. For instance, the first stage 231 can control the spool 233 of the second stage 232 to actuate or remain in a null position depending on the condition in which the propeller is operating. At times, if there is excess hydraulic fluid within the primary control valve 230, the fluid can be scavenged to the lubrication supply 212, for example, as denoted by drain 224.

Generally, the propeller assembly 106 operates in one of three conditions while the aircraft is in flight, including an onspeed condition, an overspeed condition, or an underspeed condition. An onspeed condition results when the engine is operating at the RPM set by the pilot. An overspeed condition results when the engine is operating above the RPM set by the pilot. As an example, if the aircraft begins to pitch downward into a descent maneuver, the airspeed increases across the propeller blades. When this occurs, the propeller blades are unable to fully absorb the engine power, and as a result, the engine RPM increases above the desired setting resulting in an overspeed condition. An underspeed condition results when the engine is operating below the RPM set by the pilot. As an example, if the aircraft begins to pitch upward into a climb maneuver, the airspeed decreases across the propeller blades. When this occurs, the RPM of the engine decreases below the desired setting. During normal operation, the primary pitch control valve 230 selectively controls a flow of hydraulic fluid to or from the pitch actuation assembly 202 to maintain the RPM of the engine as near as possible to the desired setting, or stated alternatively, to maintain an onspeed condition.

Moreover, for this embodiment, the primary control valve 230 is operatively configured to feather the propeller blades 150 to a feathered position but only upon the failure of a secondary control valve (described below) and upon the occurrence of a failure condition (e.g., an engine failure condition) or upon a user input. For example, if the torque sensor 268 operatively configured to sense the output torque of the propeller shaft 136 senses that the torque is below a predetermined threshold, for this example, the engine is determined to have experienced an engine failure condition. When it is determined that the engine has experienced an engine failure condition and the secondary control valve has failed, the primary control valve 230 is operatively configured to selectively allow a controlled amount of hydraulic fluid to the pitch actuation assembly 202 such that the propeller blades 150 are actuated to a feathered position. This prevents windmilling and cuts drag to a minimum.

Referring still to FIG. 3, the pitch control unit 204 also includes a secondary pitch control valve 240. For this embodiment, the secondary pitch control valve 240 is operatively configured to take over overspeed protection functionality in the event the primary control valve 230 fails, becomes unresponsive, or erroneously drives the pitch of the propeller blades 150 toward a fine pitch position. In addition, for this example embodiment, the secondary pitch control valve 240 is also operatively configured to feather the propeller blades 150 to a full feather position when an engine failure condition has been determined, which can be determined, for example, by sensing an inadequate torque output of the engine. Moreover, for this embodiment, the secondary pitch control valve 240 is operatively configured to provide reverse enabling functionality (e.g., removal of the hydraulic lock for minimum pitch) in a way that, by design, avoids the intervention of the overspeed functionality of the secondary pitch control valve 240. Accordingly, the secondary pitch control valve 240 of the present disclosure includes overspeed protection functionality, feathering functionality, and reverse enabling functionality. That is, overspeed, feathering, and reverse functionality is combined into and provided by the secondary pitch control valve 240.

As shown in FIG. 3, for this embodiment, the secondary pitch control valve 240 is a spool-type directional EHSV. The secondary pitch control valve 240 has a first stage 241, which is a double nozzle-flapper valve that includes a toque motor, a flapper, two nozzles, and a feedback spring. The secondary pitch control valve 240 also has a second stage 242, which is a precision control spool valve. The second stage 242 of the secondary pitch control valve 240 has a valve body 245 defining a chamber and a spool 243 movable within the chamber. The secondary pitch control valve 240 is positioned downstream of and is in fluid communication with the high pressure pump 210 as well as the primary control valve 230. In particular, the secondary pitch control valve 240 is in fluid communication with the high pressure pump 210 via HP conduit 218. A portion of the high pressure hydraulic fluid from the high pressure pump 210 is delivered to the first stage 241 of the secondary pitch control valve 240 such that the high pressure hydraulic fluid can be used to actuate the spool 243 of the second stage 242. Moreover, hydraulic fluid can flow from the primary control valve 230 to the secondary control valve 240 via a control conduit 270. The control conduit 270 splits into a first control conduit 271 and a second control conduit 272 that feed different ports of the second stage 242 of the secondary control valve 240.

Depending on how the first stage 241 is controlled to actuate the spool 243, the secondary control valve 240 can selectively allow a flow of hydraulic fluid to and from the pitch actuation assembly 202. The first stage 241 controls the spool 243 of the secondary pitch control valve 240 to allow the primary control valve 230 to be in fluid communication with the pitch actuation assembly 202 or to drain fluid from the pitch actuation assembly 202 through the drain 224 depending on the condition in which the propeller is operating or if the engine has experienced a failure condition.

The secondary control valve 240 is fluidly connected with the oil transfer bearing 186 as shown in FIG. 3. Specifically, a flight conduit 225 fluidly connects the secondary control valve 240 with the flight gallery 221 of the oil transfer bearing 186 and a ground conduit 226 fluidly connects the secondary control valve 240 with the ground gallery 222 of the oil transfer bearing 186. The beta tube 170 fluidly connects the flight gallery 221 with the chamber of the cylinder 166, and more particularly, the beta tube 170 fluidly connects the flight gallery 221 with the second side 174 of the chamber of the cylinder 166.

In the event that the primary control valve 230 fails, becomes unresponsive, or otherwise becomes inoperable, the secondary control valve 240 is operatively configured to take over the functionality of the primary control valve 230. That is, the secondary control valve 240 takes over constant speed functionality, e.g., maintaining an onspeed condition, feather functionality, and reverse enabling functionality. Accordingly, the secondary control valve 240 is adjustable between a constant speed mode, e.g., to maintain an onspeed a condition, a feather mode, and a reverse mode and is operable to selectively allow a flow of hydraulic fluid to or from the pitch actuation assembly 202 based at least in part on the mode of the secondary control valve 240. Examples are provided below.

Figure 4:
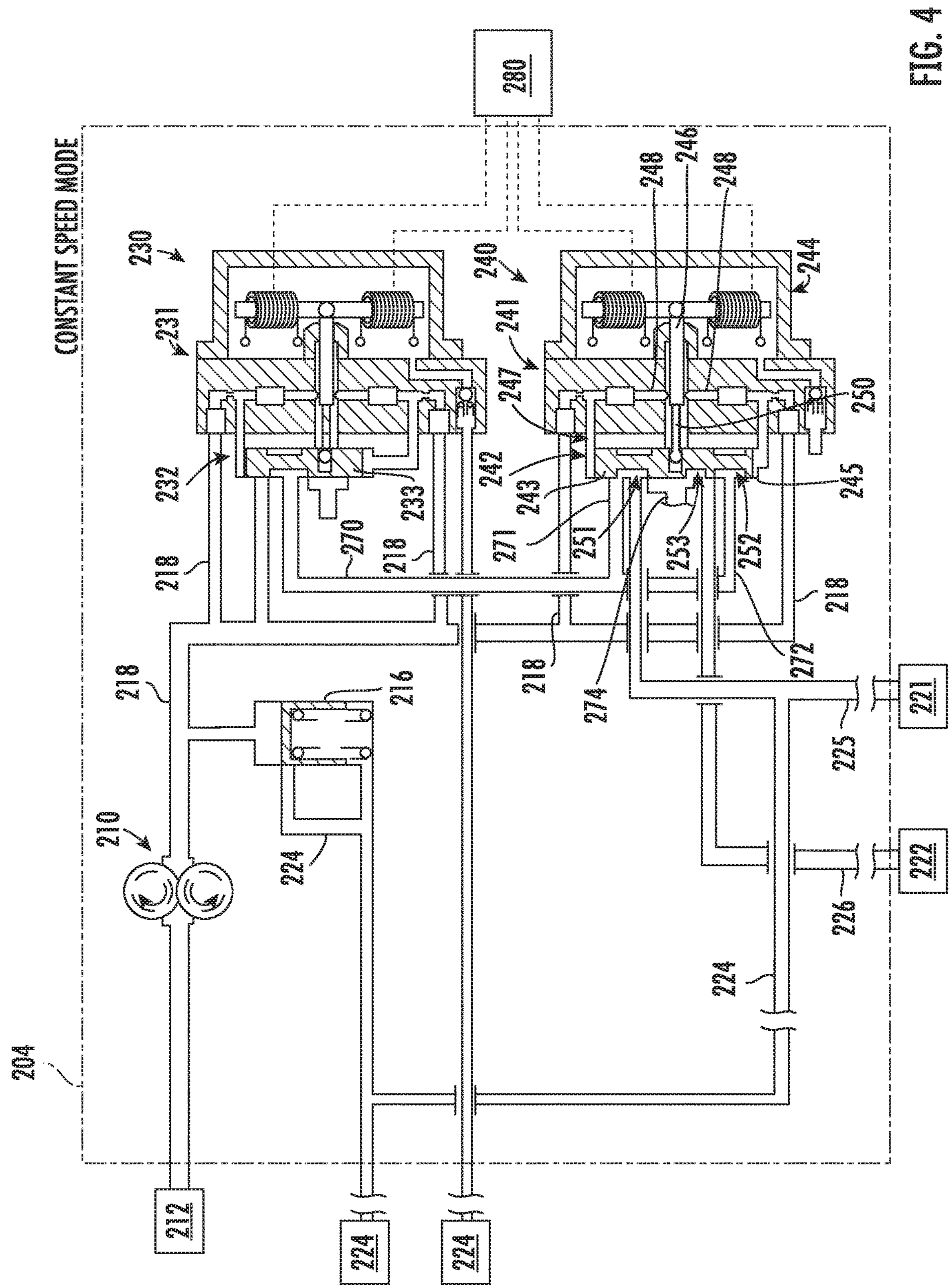
FIG. 4 provides a schematic view of a propeller control unit of the propeller control system of FIG. 3 depicting a secondary control valve in a constant speed mode.
Figure 5:
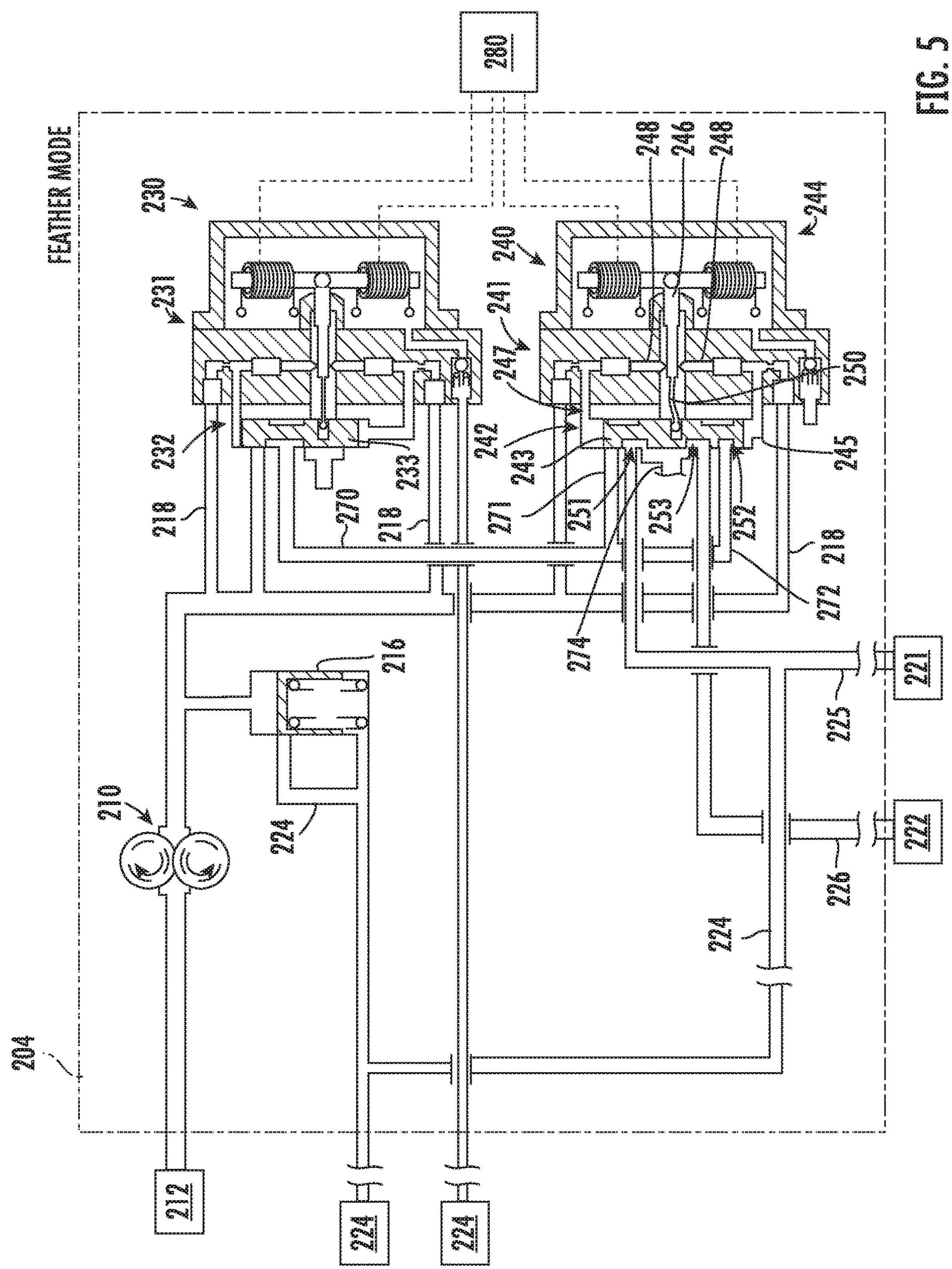
FIG. 5 provides a schematic view of the propeller control unit of FIG. 4 depicting the secondary control valve in a feather mode.
Figure 6:
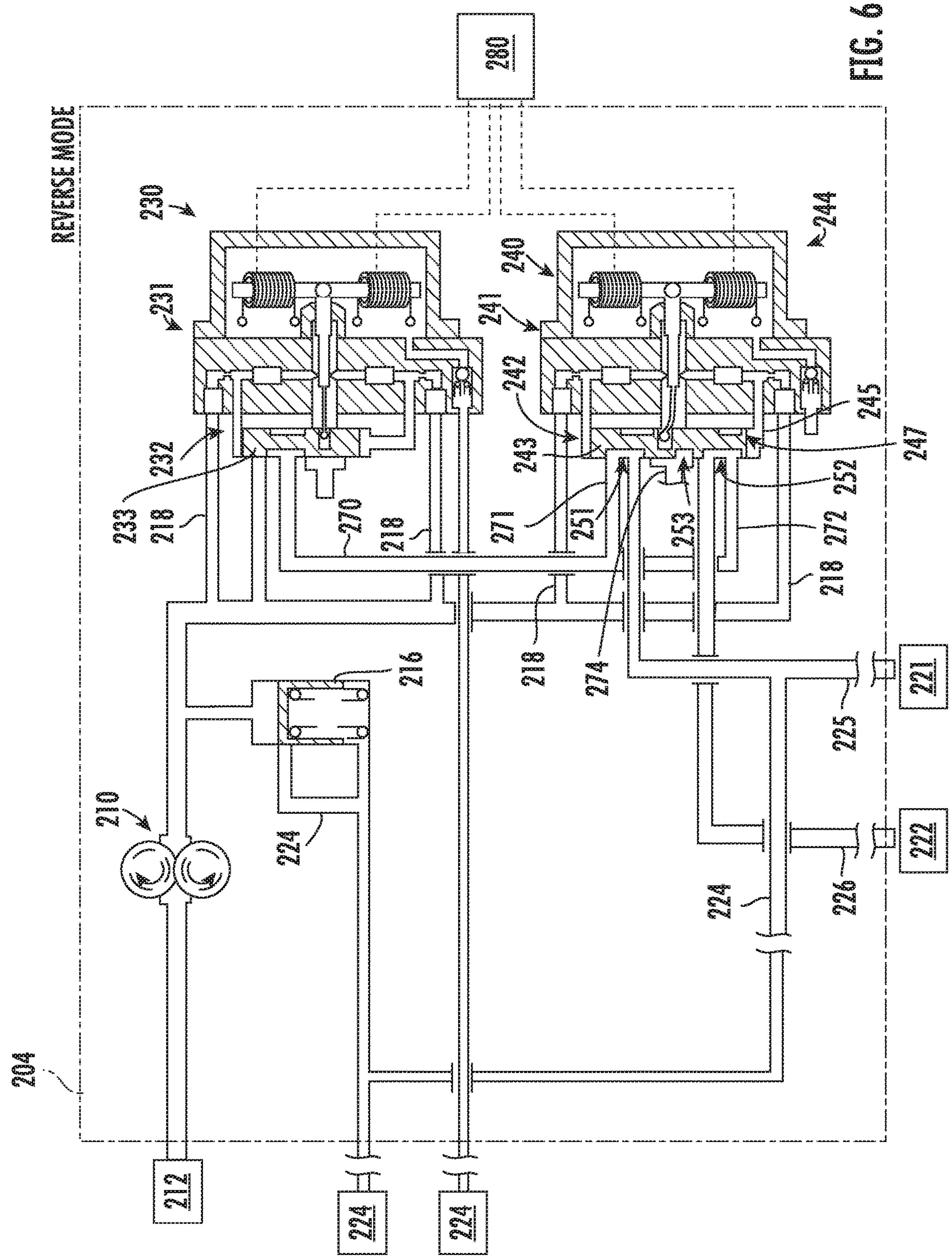
FIG. 6 provides a schematic view of the propeller control unit of FIG. 4 depicting the secondary control valve in a reverse mode.

FIGS. 4, 5, and 6 provide schematic views of the propeller control unit 204 of FIG. 3. In particular, FIG. 4 depicts the secondary control valve 240 in a constant speed mode, FIG. 5 depicts the secondary control valve 240 in a feather mode, and FIG. 6 depicts the secondary control valve 240 in a reverse mode. As noted above, the secondary control valve 240 has valve body 245 defining a chamber 247. The spool 243 is movable within the chamber 247. Particularly, the spool 243 is movable between a plurality of constant speed positions in the constant speed mode (FIG. 4), one or more feather positions in the feather mode (FIG. 5), and one or more reverse positions in the reverse mode (FIG. 6) to enable the plurality of propeller blades to rotate to a negative blade angle. Stated differently, the spool 243 is movable between a plurality of constant speed positions (FIG. 4) to operate the variable pitch propeller assembly 106 (FIG. 2) in a constant speed mode, one or more feather positions (FIG. 5) to operate the variable pitch propeller assembly 106 in a feather mode, and one or more reverse positions (FIG. 6) to operate the variable pitch propeller assembly 106 in a reverse mode.

As shown in FIG. 4, the secondary control valve 240 is in a constant speed mode. In the constant speed mode, the secondary control valve 240 controls the flow of hydraulic fluid to the pitch actuation assembly 202 (FIG. 3) to maintain an onspeed condition, e.g., by correcting overspeed and underspeed conditions. When the second control valve 240 is adjusted to the constant speed mode, the secondary control valve 240 selectively allows a flow of hydraulic fluid to flow between the chamber of the cylinder 166 (e.g., the second side 174 of the chamber) (FIG. 3) and the secondary control valve 240 to maintain an onspeed condition.

More particularly, to maintain an onspeed condition, the controller 280 first determines (e.g., automatically or via pilot input) whether an overspeed or underspeed condition is present. The controller 280 causes one or more electrical signals to be routed to a torque motor 244 of the first stage 241 of the secondary control valve 240. The torque motor 244 can include a first coil and a second coil spaced from the first coil. The first and second coils can be in electrical communication with the controller 280, and in some embodiments, a dedicated power supply (e.g., a voltage or current source). In some embodiments, the controller 280 can provide the required electrical power. When the electrical signals are provided to one or both of the coils, an electromagnetic torque is applied to an armature of the torque motor 244 that in turn causes a flapper 246 to deflect or move between a pair of opposing nozzles 248 from its resting or neutral position. Particularly, the flapper 246 moves closer to one nozzle and away from the other, causing a pressure differential over the spool 243. The pressure differential drives the spool 243 to slide or move within the chamber of the valve body 245. The displacement of the spool 243 is fed back to the flapper 246 via a feedback spring 250. The spool 243 continues to slide or move until the flow forces reach equilibrium. The secondary control valve 240 can deliver an output flow proportional to the input electrical power.

The spool 243 defines a first groove 251, a second groove 252, and a third groove 253 spaced between lands of the spool 243. When the spool 243 is in the constant speed mode, the primary control valve 230 is fluidly connected with the first groove 251 via the first control conduit 271 (as well as main control conduit 270); thus, hydraulic fluid can flow from the primary control valve 230 into the first groove 251 of the spool 243 when the spool 243 is in constant speed mode. The first groove 251 is also fluidly connected with the flight conduit 225 in the constant speed mode. Accordingly, hydraulic fluid can flow to the flight gallery 221 (FIG. 3) from the first groove 251 of the secondary control valve 240 (e.g., to move the control piston 168 to the left in FIG. 3 so that propeller blades 150 are moved to a more fine pitch position), or in some instances, hydraulic fluid can flow from the flight gallery 221 (FIG. 3) to the first groove 251 of the secondary control valve 240 (e.g., to move the control piston 168 to the right in FIG. 3 so that propeller blades 150 are moved to a more coarse pitch position). When the spool 243 is in one of the plurality of constant speed positions, the second groove 252 is not fluidly connected with the ground gallery 222 (FIG. 3). In addition, in the constant speed mode, the ground gallery 222 is fluidly connected with a drain 274 thru the third groove 253, which prevents the pitch of the blades from going below the minimum flight pitch during the flight. Drain 274 can be a common scavenge drain. Hydraulic fluid flowing along the drain 274 can be scavenged to the lubrication supply 212, for example.

By changing the electrical power input to the torque motor 244, the spool 243 can be moved or controlled within the chamber 247 to increase to decrease the hydraulic flow to the pitch actuation assembly 202. Stated more particularly, the amount of fluid within the second side 174 of the chamber of the cylinder 166 can be adjusted so that the control piston 168 can be actuated along the axial direction A, which as noted previously, ultimately adjusts the pitch of the propeller blades 150, e.g., to a more fine or coarse pitch to maintain the onspeed condition. When the propeller blades 150 are moved to a coarsened or higher pitch position to compensate for an overspeed condition, the propeller blades 150 are able to better absorb the engine power, and as a result, the engine RPM decreases to the desired setting. Consequently, the engine can return to an onspeed condition.

On the other hand, when the propeller blades 150 are moved to a finer or lower pitch position to compensate for an underspeed condition, the propeller blades 150 absorb less of the engine power, and as a result, the engine RPM increases to the desired setting. Consequently, the engine can return to an onspeed condition.

As shown in FIG. 5, the secondary control valve 240 is in feather mode. As noted, the secondary pitch control valve 240 is operatively configured to feather the propeller blades 150 to a full feather position when an engine failure condition has been determined or via a pilot input. As noted previously, when the secondary control valve 240 is in feather mode, the spool 243 is movable between one or more feather positions. For instance, as depicted in FIG. 5, the spool 243 is moved by the torque motor 244 in a similar manner as described above to a feather position. That is, for this embodiment, the spool 243 is moved in a direction slightly downward relative to the position of the spool 243 in the constant speed mode shown in FIG. 4. The deflection of the feedback spring 250 confirms the slight downward movement of the spool 243 in FIG. 5.

When the secondary control valve 240 is adjusted to the feather mode, the secondary control valve 240 selectively allows the flow of hydraulic fluid to flow from the second side 174 of the chamber of the cylinder 166 to the secondary control valve 240. More particularly, when the secondary control valve 240 is in the feather mode and thus the spool 243 is moved into one of the one or more feather positions, the primary control valve 230 is not fluidly connected with the first groove 251 of the spool 243. Particularly, the first control conduit 271 is not fluidly connected with the first groove 251. Accordingly, no additional hydraulic fluid can flow from primary control valve 230 to secondary control valve 240 and ultimately to the second side 174 of the chamber of cylinder 166 (FIG. 3). Further, as shown in FIG. 5, the second groove 252 is not fluidly connected with the ground gallery 222 when the spool 243 is in one of the one or more feather positions. More specifically, a land of the spool 243 that separates the second groove 252 from the third groove 253 prevents hydraulic fluid from flowing along the second control conduit 272 into the second groove 252 and into the ground conduit 226 to eventually flow to the ground gallery 222. Accordingly, additional hydraulic fluid is completely cutoff from flowing to the second side 174 of the chamber of cylinder 166. Hydraulic fluid can be drained from the second side 174 of the chamber such that the control piston 168 is biased by the spring 172 and the counterweights 182 toward a full feather position (i.e., the control piston 168 can translate along the axial direction A to a position furthest to the right in FIG. 3 for this embodiment). In this manner, the propeller blades 150 can be adjusted to a full feather position. In feather mode, the propeller blades 150 can cease rotation about the axial direction A, for example. Further, as shown in FIG. 5, the third groove 253 of the spool 243 provides fluid communication between ground conduit 226 and drain 274 and the first groove 251 of the spool 243 provides fluid communication between flight conduit 225 and drain 274. In this way, hydraulic fluid from the flight gallery 221 and ground gallery 222 can be scavenged, e.g., to lubrication supply 212.

As shown in FIG. 6, the secondary control valve 240 is in reverse mode. As noted, the secondary pitch control valve 240 is operatively configured to reverse the pitch angle of the propeller blades 150, e.g., to create reverse thrust. When the secondary control valve 240 is in reverse mode, the spool 243 is movable between one or more reverse positions. For instance, as depicted in FIG. 6, the spool 243 is moved by the torque motor 244 in a similar manner as described above to a reverse position. That is, for the depicted embodiment of FIG. 6, the spool 243 is moved in a direction slightly upward relative to the position of the spool 243 in the constant speed mode shown in FIG. 4. The deflection of the feedback spring 250 confirms the slight upward movement of the spool 243 in FIG. 6.

When the secondary control valve 240 is adjusted to the reverse mode, the secondary control valve 240 selectively allows the flow of hydraulic fluid to flow from the secondary control valve 240 to the second side 174 of the chamber (FIG. 3) and from the secondary control valve 240 to the ground gallery 222. More particularly, when the secondary control valve 240 is in the reverse mode and thus the spool 243 is in one of the one or more reverse positions, the primary control valve 230 is fluidly connected with the first groove 251 of the spool 243. The first groove 251 is also fluidly connected with the flight gallery 221 via the flight conduit 225 when the spool 243 is in one of the one or more reverse positions as shown in FIG. 6. That is, in one of the reverse positions, the first groove 251 of the spool 243 fluidly connects the first control conduit 271 and the flight conduit 225. Thus, hydraulic fluid can flow from the primary control valve 230 to the secondary control valve 240 and ultimately to the second side 174 of the chamber of the cylinder 166 (FIG. 3).

Moreover, when the secondary control valve 240 is adjusted to the reverse mode, the second groove 252 of the spool 243 fluidly connects the primary control valve 230 with the secondary control valve 240, e.g., via the second control conduit 272 (as well as main control conduit 270). The second groove 252 is also fluidly connected with the ground gallery 222 via the ground conduit 226 when the spool 243 is in one of the one or more reverse positions as shown in FIG. 6. Thus, hydraulic fluid can flow from the primary control valve 230 to the secondary control valve 240 and ultimately to the ground gallery 222. The flow of hydraulic fluid into the ground gallery 222 can enable the reverse functionality of the propeller assembly 106 (FIG. 3) and the flow of hydraulic fluid into the flight gallery 221 and ultimately to the second side 174 of the chamber can fill into and force the control piston 168 to engage a stop 188 (FIG. 3) (i.e., the control piston 168 is moved to a far left position in FIG. 3 by the hydraulic fluid). Moreover, in reverse mode, fluid can move from the flight gallery 221 and the ground gallery 222 to the primary control valve 230. The primary control valve 230 can drain the fluid (e.g., oil) to the oil system as needed, e.g., to increase the pitch angle of the blades.

As further shown in FIG. 6, when the spool 243 is in one of the one or more reverse positions, the drain 274 is not fluidly connected with the first control conduit 271, the second control conduit 272, the flight conduit 225, or the ground conduit 226. Thus, the third groove 253 of the spool 243 does not fluidly connect the drain 274 with the flight gallery 221, the ground gallery 222, or the primary control valve 230 when the spool 243 is in one of the one or more reverse positions. Accordingly, hydraulic fluid can flow from the primary control valve 230 through first groove 251 of the spool 243 and to the flight gallery 221 via flight conduit 225 without any of the hydraulic fluid draining via drain 274. Moreover, hydraulic fluid can flow from the primary control valve 230 through second groove 252 of the spool 243 and to the ground gallery 222 via ground conduit 226 without any of the hydraulic fluid draining via drain 274. In contrast, as shown in FIGS. 4 and 5, when the spool 243 is in one of the one or more feather positions (FIG. 5) or one of the plurality of constant speed positions (FIG. 4), the third groove 253 of the spool 243 fluidly connects the ground gallery 222 with the drain 274 via the ground conduit 226. Thus, when the spool 243 is in either a feather or constant speed positions, at least some portion of the hydraulic fluid can drain from the ground gallery 222.

Returning to FIG. 3, as noted above, the gas turbine engine 100 includes a controller 280. The controller 280 is communicatively coupled with various components of the propeller control system 200. More specifically, the controller 280 is communicatively coupled with a primary speed sensor 260, a primary blade angle feedback sensor 262, a secondary speed sensor 264, a secondary blade angle feedback sensor 266, the primary pitch control valve 230, the secondary pitch control valve 240, a torque sensor 268, the power lever 206, and other components of the propeller assembly 106. The various components of the propeller control system 200 can be communicatively coupled with the controller 280 in any suitable manner, such as e.g., by wired or wireless communication lines (shown by dashed lines in FIG. 3). The communication between the controller 280 and the various components of the propeller control system 200 will be described in turn.

As shown in FIG. 3, the controller 280 is communicatively coupled with the primary speed sensor 260 and the primary blade angle feedback sensor 262. The primary speed sensor 260 is operatively configured to sense the rotational speed of the piston rod 184, the beta tube 170, or some other rotatory component of the propeller assembly 106 that rotates in unison about the axial direction A with the propeller blades 150. During operation, the primary speed sensor 260 sends or otherwise transmits one or more signals indicative of the rotational speed of the propeller blades 150. The controller 280 receives or otherwise obtains the one or more signals indicative of the rotational speed of the propeller blades 150 and can compare the actual rotational speed of the propeller blades 150 with the RPM set by controller 280. In this manner, the controller 280 can determine whether the propeller assembly 106 is operating in an onspeed condition, an overspeed condition, or an underspeed condition. Based on the determined condition, the controller 280 can send one or more signals to the primary control valve 230 to control the spool 233 of the primary control valve 230 to selectively allow an amount of hydraulic fluid to flow to or from the pitch actuation assembly 202 so that the pitch of the propeller blades 150 can ultimately be adjusted. In this way, the propeller assembly 106 is maintained in or as close as possible to an onspeed condition.

The controller 280 is also communicatively coupled with the secondary speed sensor 264 as well as the secondary blade angle feedback sensor 266. As noted above, in the event the primary control valve 230 fails, becomes unresponsive, or erroneously drives the pitch of the propeller blades 150 toward a fine pitch position, the secondary pitch control valve 240 takes over operation of governing overspeed conditions as well as feathering the propeller blades 150 to a full feather position. The controller 280 then utilizes the secondary speed sensor 264 and may use the secondary blade angle feedback sensor 266 in conjunction with the secondary pitch control valve 240 to control the propeller assembly 106.

The secondary speed sensor 264 is operatively configured to sense the rotational speed of the piston rod 184, the beta tube 170, or some other rotational component of the propeller assembly 106 that rotates in unison about the axial direction A with the propeller blades 150. The secondary speed sensor 264 can continuously sense the rotational speed of the propeller blades 150. The secondary speed sensor 264 sends or otherwise transmits one or more signals indicative of the rotational speed of the propeller blades 150. The controller 280 receives or otherwise obtains the one or more signals indicative of the rotational speed of the propeller blades 150 and can compare the actual rotational speed of the propeller blades 150 with the RPM set in the FADEC system for overspeed governing. In this manner, the controller 280 can determine whether the propeller assembly 106 is operating in an onspeed condition, an overspeed condition, or an underspeed condition. Based on the determined condition, the controller 280 can send one or more signals to the secondary pitch control valve 240 to control the spool 243 to selectively allow an amount of hydraulic fluid to flow to or from the pitch actuation assembly 202 so that the pitch of the propeller blades 150 can ultimately be adjusted. In this way, the propeller assembly 106 can be returned to an overspeed governing onspeed condition.

To improve the accuracy and overall efficiency of the engine 100 and the propeller assembly 106, the controller 280 can receive or otherwise obtain one or more signals from the primary blade angle feedback sensor 262 and/or the secondary blade angle feedback sensor 266. The primary and secondary blade angle feedback sensors 262, 266 are operatively configured to sense the blade angle or pitch of the propeller blades 150 by measuring or sensing the axial position of the piston rod 184, the beta tube 170, or some other rotary component that is translated along the axial direction A in unison with the control piston 168. One or more signals indicative of the axial position of the piston rod 184 are sent or otherwise transmitted from the primary and/or secondary blade angle feedback sensors 262, 266 to the controller 280. The controller 280 receives or otherwise obtains the one or more signals indicative of the axial position of the piston rod 184, and based at least in part on the axial position of the piston rod 184, the controller 280 can determine the blade angle of the propeller blades 150. By knowing the pitch or blade angle of the propeller blades 150, the controller 280 can ensure that the various components of the propeller control system 200 are functioning properly. Moreover, the controller 280 can use the sensed information to improve the timing and flows of the various valves of the system such that the propeller control system 200 can become more efficient and effective at adjusting the pitch of the propeller blades 150.

For certain ground operations as well as inflight reverse thrust requirements, the primary blade angle feedback sensor 262 and/or the secondary blade angle feedback sensor 266 can sense the blade angle or pitch of the propeller blades 150 by measuring or sensing the axial position of the piston rod 184, the beta tube 170, or some other rotary component that is translated along the axial direction A in unison with the control piston 168 in the same or similar manner as noted above. One or more signals indicative of the axial position of the piston rod 184 can be sent or otherwise transmitted from the primary and/or secondary blade angle feedback sensors 262, 266 to the controller 280. The controller 280 receives or otherwise obtains the one or more signals indicative of the axial position of the piston rod 184, and based at least in part on the axial position of the piston rod 184, the controller 280 can determine the negative blade angle of the propeller blades 150.

Figure 7:
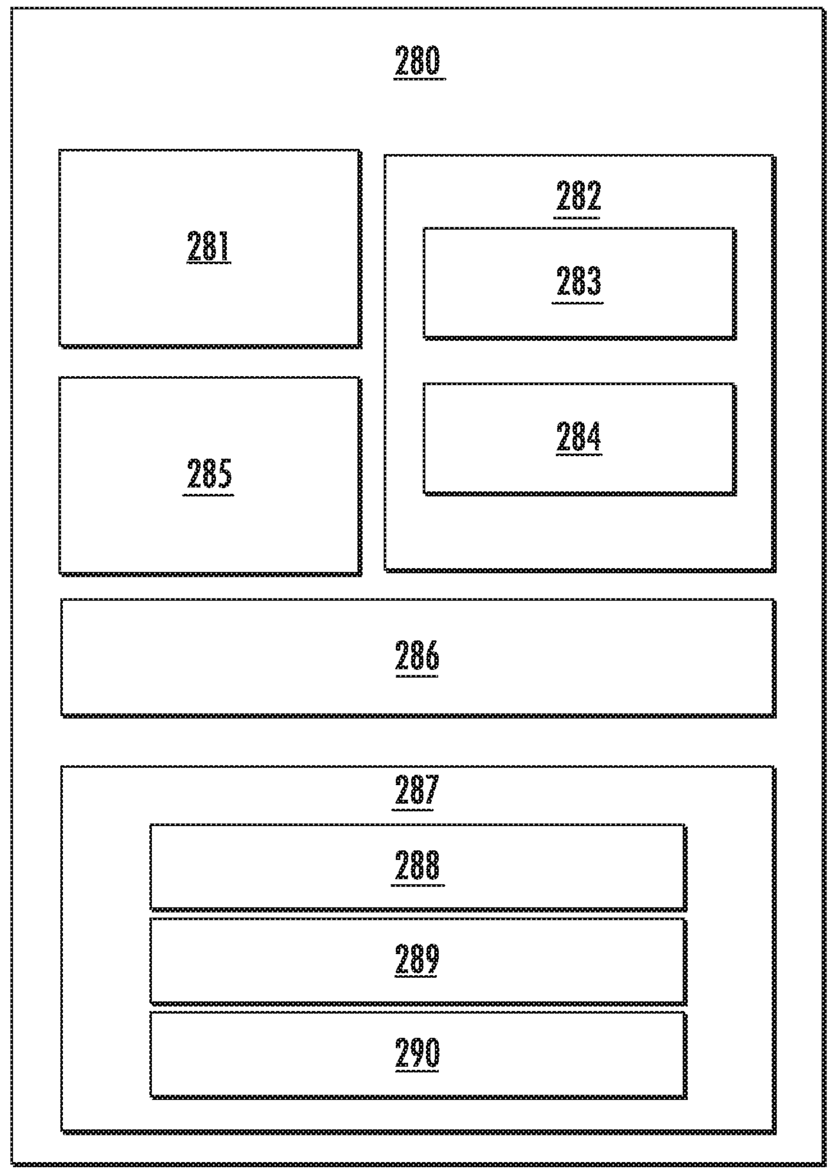
FIG. 7 provides an example controller of the gas turbine engine of FIG. 1.

FIG. 7 provides an example controller 280 of the gas turbine engine of FIGS. 1 and 2 for controlling the propeller control system 200 in a manner as described above. The controller 280 includes various components for performing various operations and functions, such as e.g., receiving one or more signals from the sensors of the propeller control system 200 and the power lever 206, determining the condition of the propeller assembly 106 and engine 100, sending one or more signals to the first pitch control valve 230 to control the amount of hydraulic fluid to the pitch actuation assembly 202 if the propeller is determined to be in the overspeed condition or underspeed condition, and the secondary control pitch valve 240 to control the amount of hydraulic fluid to the pitch actuation assembly 202 if the propeller is in an engine failure condition, a feather condition based on a pilot or user input, etc. That is, the controller 280 controls the primary control valve 230 to supply/drain oil to/from the flight gallery 221 and controls the secondary control valve 240 to select the "working" mode in case of a failure of the primary control valve 230.

As shown in FIG. 7, the controller 280 can include one or more processor(s) 281 and one or more memory device(s) 282. The one or more processor(s) 281 can include any suitable processing device, such as a microprocessor, microcontroller, integrated circuit, logic device, and/or other suitable processing device. The one or more memory device(s) 282 can include one or more computer-readable media, including, but not limited to, non-transitory computer-readable media, RAM, ROM, hard drives, flash drives, and/or other memory devices.

The one or more memory device(s) 282 can store information accessible by the one or more processor(s) 281, including computer-readable instructions 284 that can be executed by the one or more processor(s) 281. The instructions 284 can be any set of instructions that when executed by the one or more processor(s) 281, cause the one or more processor(s) 281 to perform operations. In some embodiments, the instructions 284 can be executed by the one or more processor(s) 281 to cause the one or more processor(s) 281 to perform operations, such as any of the operations and functions for which the controller 280 or controllers are configured, such as e.g., receiving one or more signals from sensors and determining an axial position of the beta tube 170 such that the blade angle of the propeller blades 150 can be determined. The instructions 284 can be software written in any suitable programming language or can be implemented in hardware. Additionally, and/or alternatively, the instructions 284 can be executed in logically and/or virtually separate threads on processor(s) 281.

The memory device(s) 282 can further store data 283 that can be accessed by the one or more processor(s) 281. The data 283 can also include various data sets, parameters, outputs, information, etc. shown and/or described herein. The controller 280 can also include a communication interface 285 used to communicate, for example, with other components of an aircraft in which the gas turbine engine 100 is mounted to, such as e.g., another controller configured to control another engine of the aircraft. The communication interface 285 can include any suitable components for interfacing with one or more network(s), including for example, transmitters, receivers, ports, controllers, antennas, and/or other suitable components.

As shown further in FIG. 7, the controller 280 includes primary logic 286 and secondary logic 287. Although the primary logic 286 and the secondary logic 287 are shown as separate from the one or more processor(s) 281 and the one or more memory device(s) 282, the primary and secondary logic 286, 287 can be embodied in the one or more processor (s) 281 and the one or more memory device(s) 282 described above. The primary logic 286 is operatively configured to control the primary control valve 230. The secondary logic 287 is operatively configured to control the secondary pitch control valve 240. In particular, the secondary logic 287 includes a constant speed logic module 288, a feathering logic module 289, and a reverse logic module 290. The constant speed logic module 288 provides controller 280 with the logic to control the secondary pitch control valve 240 in actuating the propeller blades 150, e.g., to a higher more coarse pitch to ultimately move propeller assembly 106 from an overspeed condition to governing to a selected speed condition. Likewise, the feathering logic module 289 provides controller 280 with the logic to control the secondary pitch control valve 240 in actuating the propeller blades 150 to a full feather position when an engine failure condition has been determined by the controller 280 or upon a user or pilot input. Further, the reverse logic module 290 provides controller 280 with the logic to control the secondary pitch control valve 240 in actuating the propeller blades 150 to a negative pitch position when a reverse condition has been determined by the controller 280 or upon a user or pilot input.

Figure 8:
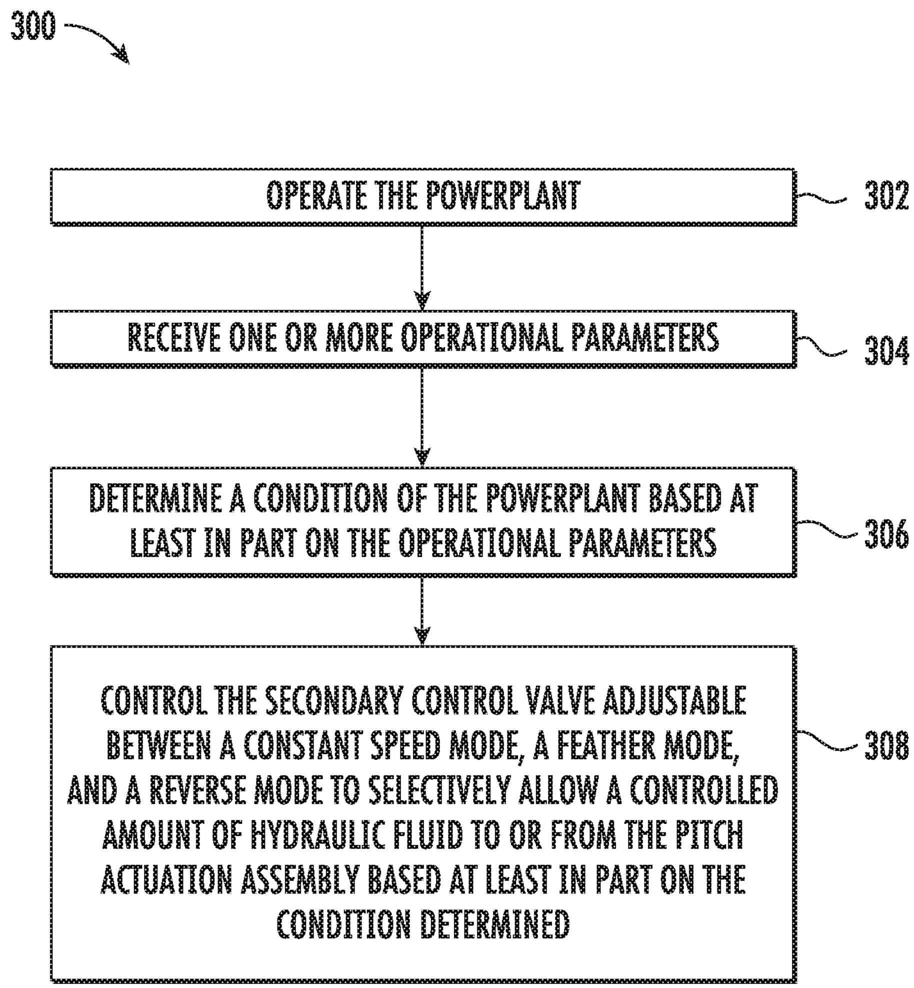
FIG. 8 provides an example flow diagram according to an example embodiment of the present disclosure.

FIG. 8 provides a flow diagram of an example method (300) for controlling a variable pitch propeller assembly driven by a powerplant using a propeller control system. The powerplant, such as e.g., the engine 100 of FIGS. 1 and 2, defines an axial direction and a radial direction. The engine has a controller, such as e.g., controller 280 described herein. The variable pitch propeller assembly has a plurality of propeller blades rotatable about the axial direction and adjustable about respective pitch axes each extending along the radial direction. The propeller control system has a pitch actuation assembly for actuating the propeller blades about their respective pitch axes and a pitch control unit for driving the pitch actuation assembly. The pitch control unit has a primary control valve and a secondary control valve both communicatively coupled with the controller. The primary control valve and the secondary control valve are each configured to selectively control a flow of hydraulic fluid to or from the pitch actuation assembly. For instance, the primary control valve can control the flow of hydraulic fluid during normal operation. The secondary control valve can control the flow of hydraulic fluid to the pitch actuation assembly when the primary control valve fails or otherwise becomes unresponsive. In this way, the secondary control valve acts as a failsafe. Some or all of the method (300) can be implemented by one or more of the components described herein, such as e.g., the controller 280, the sensors 260, 262, 264, 266, 268, physical components, etc.

At (302), the method (300) includes operating the powerplant. For example, as noted above, the powerplant can be the gas turbine engine shown and described in FIGS. 1 and 2.

At (304), the method (300) includes receiving, by the controller, one or more operational parameters of the powerplant. For instance, in some example implementations, the one or more operational parameters can be indicative of a power setting of the powerplant. The one or more operational parameters indicative of the power setting of the powerplant can be obtained by the controller 280. The power lever 206, or an angular position sensor device, can send one or more signals indicative of the angle of the power lever 206. Based on the angle of the power lever 206, the controller 280 can determine the power setting selected by the pilot. As another example, the power setting selected by the pilot can be digitized, and thus, the power setting can be transmitted to the controller 280 digitally.

In some example implementations, the one or more operational parameters can be indicative of the rotational speed of the propeller blades 150 about the axial direction A. For instance, the rotational speed of the propeller blades 150 can be determined by the controller 280 based on one or more signals from the primary speed sensor 260 and/or the secondary speed sensor 264. The primary or secondary speed sensors 260, 264 can sense or measure the rotational speed of a rotary component, such as, e.g. the piston rod 184, the beta tube 170, or some other rotary component that rotates about the axial direction A in unison with the propeller blades 150.

In some example implementations, the one or more operational parameters can be indicative of a torque output of the powerplant. For instance, the torque sensor 268 positioned proximate the propeller shaft 136 (FIG. 3) can sense the torque output of the core turbine engine 104 of the powerplant. One or more signals indicative of the torque output can be routed to the controller 280.

In some example implementations, the one or more operational parameters can be indicative of an angular position of a condition lever or a selected condition of the powerplant. For instance, the cockpit of the aircraft or vehicle in which the turboprop and propeller assembly are mounted can include a condition lever. A pilot or crew member can selectively adjust the condition lever to select a condition of the propeller assembly. For instance, the angular position of the condition lever can be indicative of a reverse mode or a feather mode.

At (306), the method (300) includes determining, by the controller, a condition of the powerplant based at least in part on the one or more operational parameters. For example, the condition could be one of an overspeed condition, an underspeed condition, a feather condition or an engine or powerplant failure condition, a reverse thrust condition, etc.

For example, in implementations in which the one or more operational parameters are indicative of the rotational speed of the propeller blades 150 about the axial direction A, at (306) the method (300) can include determining the rotational speed of the propeller blades 150 and comparing the power setting with the rotational speed of the propeller blades. In this way, the controller 280 can determine whether the powerplant or engine is operating in an onspeed condition, an underspeed condition, or an overspeed condition. Once the condition of the powerplant or engine is known, the propeller control system 200 can make the necessary adjustments to the pitch of the propeller blades 150, e.g., at (308) below.

As another example, in implementations in which the one or more operational parameters are indicative of a torque output of the powerplant, at (306) the method (300) can include comparing the power setting with the torque output of the powerplant. If the torque output of the powerplant is at or below a predetermined threshold for the given power setting, the controller 280 can determine that a powerplant or engine failure condition has occurred. When such a powerplant failure condition has been determined, the controller 280 can send one or more signals to the primary control valve 230 to actuate the primary control valve 230 such that the propeller blades 150 are actuated to a fully feathered position. If however, the primary control valve 230 fails or is otherwise unresponsive, the controller 280 can send one or more signals to the secondary control valve 240 to actuate the secondary control valve 240 such that the propeller blades 150 are actuated to a fully feathered position.

As a further example, in implementations in which the one or more operational parameters are indicative of an angular position of a condition lever or a selected condition of the powerplant, at (306) the method (300) can include determining the condition of the powerplant based at least in part on the angular position of the condition lever or the selected user input.

At (308), the method (300) includes controlling, by the controller, the secondary control valve adjustable between a constant speed mode, a feather mode, and a reverse mode to selectively allow a controlled amount of hydraulic fluid to or from the pitch actuation assembly based at least in part on the condition determined. For instance, the spool 243 of the secondary control valve 240 of FIGS. 4, 5, and 6 can be moved to selectively allow a controlled amount of hydraulic fluid to or from the pitch actuation assembly based at least in part on the condition determined. For instance, if an overspeed condition or feather condition (e.g., an engine failure condition) is determined, hydraulic fluid can be drained from the pitch actuation assembly in a manner described herein. If, a reverse thrust condition is determined, the hydraulic fluid can be directed to the flight gallery 221 and the ground gallery 222 to enable reverse functionality and to actuate the control piston 168 to a more fine position such that the propeller blades are ultimately pitched to a reverse angle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A variable pitch propeller assembly for an engine defining an axial direction, a radial direction, and a circumferential direction, the variable pitch propeller assembly comprising:

a plurality of propeller blades rotatable about the axial direction and spaced apart along the circumferential direction, each propeller blade rotatable through a plurality of blade angles about respective pitch axes, the pitch axes extending in the radial direction;

a pitch actuator to adjust the plurality of propeller blades through the plurality of blade angles; and a pitch control unit to drive the pitch actuator, the pitch control unit including:

a primary control valve;

a secondary control valve including a first stage and a second stage, the first stage and the primary control valve fluidly connected to a source of hydraulic fluid via a common conduit, and the second stage directly connected to the primary control valve and not directly connected to the source of hydraulic fluid; and a controller in communication with the primary control valve and the secondary control valve, the primary control valve configured to selectively allow a flow of the hydraulic fluid to or from the pitch actuator via the secondary control valve, and the secondary control valve adjustable between a constant speed mode, a feather mode, and a reverse mode, the secondary control valve configured to selectively allow a flow of the hydraulic fluid to or from the pitch actuator based at least in part on the mode of the secondary control valve.

2. The variable pitch propeller assembly of claim 1, wherein the secondary control valve has a valve body defining a chamber and a spool movable within the chamber, and wherein the spool is movable between a plurality of constant speed positions in the constant speed mode, one or more feather positions in the feather mode, and one or more reverse positions in the reverse mode to enable the plurality of propeller blades to rotate to a negative blade angle.

3. The variable pitch propeller assembly of claim 1, wherein the primary control valve is connected to the secondary control valve via a control conduit, the control conduit split into a first control conduit and a second control conduit feeding different ports of the second stage of the secondary control valve.

4. The variable pitch propeller assembly of claim 1, wherein the pitch actuator includes:

a cylinder defining a chamber;

a control piston translatable within the cylinder;

a piston rod connected to the control piston and extending into a propeller gear box of the engine, the piston rod translatable in unison with the control piston;

an oil transfer bearing surrounding the piston rod within the propeller gear box of the engine and defining a flight gallery fluidly connected with the secondary control valve and a ground gallery fluidly connected with the secondary control valve; and a beta tube enclosed within the piston rod and fluidly connecting the flight gallery with the chamber of the cylinder.

5. The variable pitch propeller assembly of claim 4, wherein when the secondary control valve is in the feather mode, the secondary control valve allows the flow of hydraulic fluid to flow from the chamber of the cylinder to the secondary control valve.

6. The variable pitch propeller assembly of claim 4, wherein when the secondary control valve is in the reverse mode, the secondary control valve allows the flow of hydraulic fluid to flow from the secondary control valve to the chamber and from the secondary control valve to the ground gallery.

7. The variable pitch propeller assembly of claim 4, wherein when the secondary control valve is in the constant speed mode, the secondary control valve allows the flow of hydraulic fluid to flow between the chamber and the secondary control valve to maintain an onspeed condition.

8. The variable pitch propeller assembly of claim 4, wherein a flight gallery conduit fluidly connects the secondary control valve with the flight gallery and a ground gallery conduit fluidly connects the secondary control valve with the ground gallery.

9. The variable pitch propeller assembly of claim 1, wherein the secondary control valve is configured to selectively allow a flow of the hydraulic fluid to or from the pitch actuator based at least in part on a failure or unresponsive state of the primary control valve.

10. A variable pitch propeller assembly for an engine defining an axial direction, a radial direction, and a circumferential direction, the variable pitch propeller assembly comprising:

a plurality of propeller blades rotatable about the axial direction and spaced apart along the circumferential direction, each propeller blade rotatable through a plurality of blade angles about respective pitch axes each of the pitch axes extending in the radial direction;

a pitch actuator to adjust the plurality of propeller blades through the plurality of blade angles; and a pitch control unit to drive the pitch actuator, the pitch control unit including:

a primary control valve;

a secondary electrohydraulic servovalve (EHSV) control valve including a first stage and a second stage, the first stage and the primary control valve fluidly connected to a source of hydraulic fluid via a common conduit, and the second stage directly connected to the primary control valve and not directly connected to the source of hydraulic fluid; and a controller in communication with the primary control valve and the secondary EHSV control valve, the primary control valve configured to selectively allow a flow of hydraulic fluid to or from the pitch actuator via the secondary EHSV control valve, and the secondary EHSV control valve having a valve body defining a chamber and a spool movable within the chamber, the spool is movable between a plurality of constant speed positions to operate the variable pitch propeller assembly in a constant speed mode, one or more feather positions to operate the variable pitch propeller assembly in a feather mode, and one or more reverse positions to operate the variable pitch propeller assembly in a reverse mode, the secondary EHSV control valve configured to selectively allow the flow of hydraulic fluid to or from the pitch actuator based at least in part on a failure or unresponsive state of the primary control valve.

11. The variable pitch propeller assembly of claim 10, wherein the spool defines a first groove and a second groove, and wherein the primary control valve is fluidly connected with the first groove when the spool is in one of the plurality of constant speed positions or in one of the one or more reverse positions.

12. The variable pitch propeller assembly of claim 11, wherein the primary control valve is not fluidly connected with the first groove of the spool when the spool is in one of the one or more feather positions.

13. The variable pitch propeller assembly of claim 10, wherein the pitch actuator includes:

a cylinder defining a chamber;

a control piston translatable within the cylinder;

a piston rod connected to the control piston and extending into a propeller gear box of the engine, the piston rod translatable in unison with the control piston;

an oil transfer bearing surrounding the piston rod within the propeller gear box of the engine and defining a flight gallery fluidly connected with the secondary EHSV control valve and a ground gallery fluidly connected with the secondary EHSV control valve; and a beta tube enclosed within the piston rod and fluidly connecting the flight gallery with the chamber of the cylinder.

14. The variable pitch propeller assembly of claim 13, wherein the spool defines a first groove and a second groove, and wherein the first groove is fluidly connected with the flight gallery and the second groove is fluidly connected with the ground gallery when the spool is in one of the one or more reverse positions, and wherein the second groove is not fluidly connected with the ground gallery when the spool is in one of the one or more feather positions or when the spool is in one of the plurality of constant speed positions.

15. The variable pitch propeller assembly of claim 14, wherein the spool defines a third groove, wherein the secondary EHSV control valve is fluidly connected with a drain, and wherein when the spool is in one of the one or more reverse positions, the third groove does not fluidly connect the ground gallery with the drain, and wherein when the spool is in one of the one or more feather positions or one of the plurality of constant speed positions, the third groove fluidly connects the ground gallery with the drain.

* * * * *